(12) United States Patent
Takemoto et al.

(10) Patent No.: US 7,349,568 B2
(45) Date of Patent: Mar. 25, 2008

(54) METHOD AND APPARATUS FOR HANDLING STEREOSCOPIC IMAGES UTILIZING PARALLAX IMAGES

(75) Inventors: Satoshi Takemoto, Takatsuki (JP); Takahisa Ando, Ikoma (JP); Ken Mashitani, Neyagawa (JP); Masahiro Higashino, Higashiosaka (JP); Goro Hamagishi, Toyonaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 966 days.

(21) Appl. No.: 10/227,897

(22) Filed: Aug. 27, 2002

(65) Prior Publication Data

US 2003/0043262 A1 Mar. 6, 2003

(30) Foreign Application Priority Data

| Aug. 30, 2001 | (JP) | 2001-261304 |
| Sep. 21, 2001 | (JP) | 2001-289401 |
| Sep. 21, 2001 | (JP) | 2001-289402 |
| Sep. 26, 2001 | (JP) | 2001-294955 |
| Sep. 28, 2001 | (JP) | 2001-303446 |
| Sep. 28, 2001 | (JP) | 2001-303447 |

(51) Int. Cl.
*G06K 9/00* (2006.01)
*G06T 15/00* (2006.01)
*G01C 3/14* (2006.01)
*H04N 13/00* (2006.01)
*H04N 15/00* (2006.01)
*G03B 35/00* (2006.01)

(52) U.S. Cl. .......... 382/154; 345/419; 356/12; 348/42; 348/51; 396/324

(58) Field of Classification Search ........ 382/106, 382/154; 345/419–427; 356/12–22; 348/42–60; 396/324–333
See application file for complete search history.

(56) References Cited

U.S. PATENT DOCUMENTS

| 2,045,120 | A | * | 6/1936 | Carpenter | 353/7 |
| 2,218,875 | A | * | 10/1940 | Parsell | 352/43 |
| 5,111,313 | A | * | 5/1992 | Shires | 359/17 |
| 5,233,436 | A | * | 8/1993 | Oksman et al. | 386/46 |

(Continued)

FOREIGN PATENT DOCUMENTS

JP 64-032332 2/1989

(Continued)

OTHER PUBLICATIONS

Japanese Office Action dated Mar. 6, 2007, Application No. 2001-303447.

*Primary Examiner*—Bhavesh M Mehta
*Assistant Examiner*—Manav Seth
(74) *Attorney, Agent, or Firm*—Westerman, Hattori, Daniels & Adrian, LLP.

(57) ABSTRACT

An image acquiring unit acquires a two-dimensional image from a digital camera and a stereoscopic image from a stereo image storage, and sends those images to a pixel replacing unit. The pixel replacing unit replaces pixels, among the two-dimensional image, corresponding to an object such as a pattern depicted in the stereoscopic image, by pixels of the object. An image providing unit transmits a thus generated completed image to the user. Part of the two-dimensional image is displayed stereoscopically by a stereoscopic image.

8 Claims, 33 Drawing Sheets

U.S. PATENT DOCUMENTS

| | | | |
|---|---|---|---|
| 5,703,704 A * | 12/1997 | Nakagawa et al. | 359/9 |
| 5,719,948 A * | 2/1998 | Liang | 382/112 |
| 5,993,001 A * | 11/1999 | Bursell et al. | 351/212 |
| 6,062,604 A * | 5/2000 | Taylor et al. | 283/72 |
| 6,310,724 B1 * | 10/2001 | Shirochi | 359/569 |
| 6,366,281 B1 * | 4/2002 | Lipton et al. | 345/419 |
| 6,373,965 B1 * | 4/2002 | Liang | 382/112 |
| 6,618,051 B1 * | 9/2003 | Edwards et al. | 345/427 |
| 2001/0026248 A1 * | 10/2001 | Goren et al. | 345/7 |
| 2002/0173977 A1 * | 11/2002 | Dutta | 705/1 |
| 2003/0137145 A1 * | 7/2003 | Fell et al. | 283/72 |

FOREIGN PATENT DOCUMENTS

| | | |
|---|---|---|
| JP | 5-54123 | 3/1993 |
| JP | 10-028276 | 1/1998 |
| JP | 10-153773 | 6/1998 |
| JP | 2000-102038 | 4/2000 |
| JP | 2000-190669 | 7/2000 |
| JP | 2000-197074 | 7/2000 |
| JP | 2000-261654 A | 9/2000 |
| JP | 2001-075498 | 3/2001 |
| JP | 2001-165672 | 6/2001 |
| JP | 2001-188733 | 7/2001 |
| JP | 2001-195491 | 7/2001 |

* cited by examiner

| ID 3150 | TYPE OF FILTER 3152 | PROVIDABLE NUMBER 3154 | PROVIDED NUMBER 3156 | VIEWER PROGRAM OUTPUT FLAG 3158 |
|---|---|---|---|---|
| ... | ... | ... | ... | ... |
| 3256 | SAMPLE | 5 | 3 | 1 |
| 3257 | SAMPLE | 5 | 0 | 0 |
| ... | ... | ... | ... | ... |
| 10214 | REGULAR | — | 105 | 1 |
| 10215 | REGULAR | — | 0 | 0 |
| ... | ... | ... | ... | ... |

| USER ID | PASSWORD | TYPE OF MEMBERSHIP | EXPIRATION DATE |
|---|---|---|---|
| Hana | abcd1234 | 3 | SEPT. 30, 2001 |
| Taro | cdef2345 | 1 | — |
| Yoshi | defg3456 | 2 | — |
| ⋮ | ⋮ | ⋮ | ⋮ |

Fig. 21

METHOD AND APPARATUS FOR HANDLING STEREOSCOPIC IMAGES UTILIZING PARALLAX IMAGES

BACKGROUND OF THE INVENTION

1. Field of the Invention

The present invention relates to a technology for processing and handling stereoscopic images. More specifically, this invention relates to a method and apparatus for synthesizing two-dimensional images and stereoscopic images, a method for ordering an optical filter for use with stereovision, a method, apparatus and system for providing image contents used for stereovision, and a method and apparatus for authenticating users via a network.

2. Description of the Related Art

In the past several years, the population of Internet users has increased explosively, thus setting a new stage in the use of the Internet called the broadband age. The broadband communication with markedly increased communication bandwidths is expected to promote the distribution of heavy image data, which tended to be avoided in the past. With the arrival of the broadband age, such concepts as "multimedia" or "video on demand" can now be experienced by general users for the first time with a sense of reality.

As the distribution of images, especially moving images, expands, it is natural that the users seek greater richness in contents and better image quality. This is mainly due to such efforts and achievements as the digitization of existing image software, the development of authoring tools therefor and the pursuit of image coding technologies featuring higher efficiency and reduced losses.

Under these circumstances, it seems that the industry will focus much attention in the near future on pseudo-three-dimensional images (hereinafter simply referred to also as "three-dimensional images", "stereoscopic images" or "stereo images") as a form of digital image contents, which are believed to create a growing market. There are now technological foundations for stereoscopic images that satisfy the wishes of the users for more realistic images and allow them to not simply appreciate them but participate in the creation thereof. This is a new mode of interaction between images and users that has hitherto been unthinkable. Moreover, stereo images will be useful for the realistic presentation of products in EC (electronic commerce) which is believed to become a standard commercial practice in the twenty first century.

There is a technology using parallax images as a technology for showing an object stereoscopically using a two-dimensional display device. FIG. 1 shows a method of stereoscopic vision using parallax images. First, to produce a parallax, there are provided an image to be cast to the right eye (hereinafter referred to simply as "right-eye image 12") and an image to be cast to the left eye (hereinafter referred to simply as "left-eye image 14"). A basic image 10 is generated by arranging these parallax images alternately at fixed intervals, namely, by thinning them out at every other pixel for instance. This basic image 10 is displayed on a two-dimensional display device.

A stereoscopic vision cannot be obtained by seeing the basic image 10 directly. It is only possible when an optical filter 20 is placed in an intervening space so as to direct the respective parallax images to enter the right eye and the left eye, respectively. For example, the optical filter 20 is an image separation means, such as a parallax barrier or a lenticular lens; in FIG. 1 a parallax barrier is taken as an example. This optical filter 20 is a glass plate on which there are formed stripe patterns that function as slits 16, so that the right-eye image 12 is led to the right eye and the left-eye image 14 is led to the left eye. The pitch of the slits 16 is not fixed and is determined geometrically. At the edges of a screen in particular, the slits will come widely displaced from the front of the pixels. In FIG. 1, the slits 16 are represented schematically, but in reality a very delicate pitch design is carried out based on a relationship of images to the head position of the user.

For a new Internet or network business of distributing stereo images using these technologies, it can be said that there is still neither infrastructure nor models for promoting it. In particular, it is with delicate differences that each user visually captures stereo images, but technology to deal with such an aspect has not been cultivated at least at an actual service level. Moreover, broadening the use of the optical filter 20 is a key to the success of stereo image distribution business.

SUMMARY OF THE INVENTION

The present invention has been made in view of foregoing circumstances, and an object thereof is to provide an image synthesizing technology that can enrich image contents while making use of characteristics of stereo images to the best advantage.

A preferred embodiment according to the present invention relates to an image synthesizing method. This method includes: acquiring a two-dimensional image and a stereoscopic image that assumes a plurality of viewpoints and is constituted by background and an object; and, as for a pixel among the two-dimensional image overlapped with a pixel constituting the object in the event that the acquired stereoscopic image is superposed on the acquired two-dimensional image, replacing the former with the latter, so as to produce stereovision on part of the two-dimensional image overlapped with the object.

The "former" represents a pixel or pixels constituting the above-mentioned object in the two-dimensional image while the "latter" represents a pixel or pixels overlapped with the former and belonging to the stereoscopic image. One example of the "two-dimensional image" is an ordinary photograph taken by a digital camera. The "object" is the substantial part of the photograph such as a photographic object, but may also be a virtual pattern or any region that can be distinguished from the background. According to this method, a desired region in the two-dimensional image, namely, the area in which an object exists, can be replaced by the image of the object, and moreover the object portion can be stereoscopically viewed, so that a special effect can be added to the two-dimensional image.

Another preferred embodiment according to the present invention relates also to an image synthesizing method. This method includes: acquiring a two-dimensional image and a stereoscopic image that assumes a plurality of viewpoints; generating an initial image by selecting pixels, which are to be reproduced farther than the two-dimensional image, from among pixels of the stereoscopic image; generating an intermediate image by selecting a marked region from the two-dimensional image and by superposing it on the initial image; and generating a completed image by selecting pixels, which are to be reproduced forward than the two-dimensional image, from among pixels of the stereoscopic image and by superposing them on the intermediate image. The "marked region" may be defined to be smaller than the initial image.

According to this method, a distant view and a near view can be added stereoscopically to the two-dimensional image. Moreover, a region having greater depth is drawn first and foreground images are gradually superposed thereon, so that a natural image can be generated with a relatively small computational load.

Still another preferred embodiment according to the present invention relates also to an image synthesizing method. This method includes: acquiring a two-dimensional image owned by a user and a stereoscopic image having a special effect; replacing at least part of pixels of the two-dimensional image by pixels of the stereoscopic image; and providing the two-dimensional image, at least part of which is made stereoscopic, obtained by said replacing, with the user. This method can be realized by a local environment at a user side, and may be realized at a server side via a network. It can be realized by hardware, software or the combination thereof. "providing it with the user" means that the image is transmitted to the user, it is stored in a storage accessible from the user, it is outputted to a printer and other devices and apparatuses in a mode desired by the user, it is distributed to a network address, specified by the user, as electronic mail attachment or electronic mail contents and so forth, so there are various forms in "providing it with the user".

Still another preferred embodiment according to the present invention relates to an image synthesizing apparatus. This apparatus includes: an image acquiring unit which acquires a two-dimensional image and a stereoscopic image that assumes a plurality of viewpoints and is constituted by background and an object; and an image replacing unit which replaces a pixel of the two-dimensional image by a pixel constituting the object where the pixel of the two dimensional image is overlapped with the pixel constituting the object in the event that the acquired stereoscopic image is superposed on the acquired two-dimensional image, so as to produce stereovision on part of the two-dimensional image overlapped with the object, and which thereby generates a completed image.

Still another preferred embodiment according to the present invention relates also to an image synthesizing apparatus. This apparatus includes: an image acquiring unit which acquires a two-dimensional image and a stereoscopic image that assumes a plurality of viewpoints; a first replacing unit which generates an initial image by selecting pixels, which are to be reproduced farther than the two-dimensional image, from among pixels of the stereoscopic image; a second replacing unit which generates an intermediate image by selecting a marked region from the two-dimensional image and by superposing it on the initial image; and a third replacing unit which generates a completed image by selecting pixels, which are to be reproduced forward than the two-dimensional image, from among pixels of the stereoscopic image and by superposing them on the intermediate image.

Still another preferred embodiment according to the present invention relates also to an image synthesizing apparatus. This apparatus is a server-side apparatus in an apparatus constituting a client-server system, the server-side apparatus including: an image acquiring unit which acquires from a client a two-dimensional image owned by a user; a pixel replacing unit which replaces at least part of pixels of the two-dimensional image by pixels of a stereoscopic image having a special effect; and an image providing unit which provides a completed image, obtained by said replacing unit, with the user.

This apparatus may further include a stereoscopic image storage which stores a plurality of the stereoscopic images and a selection receiving unit which displays the stored stereoscopic images in such a state as to be selectable by the user, wherein a stereoscopic image selected by the user and the two-dimensional image owned by the user may be processed by the pixel replacing unit. By implementing this structure, the user can select the stereoscopic image as if the stereoscopic image were a frame for a photo, thus improving the added value for a service.

This apparatus may further include an output processing unit which outputs the completed image in an outputting mode suited for a predetermined purpose. The outputting mode includes storing the completed image in the storage, sending electronic mail and so forth.

Another object of the present invention is to provide a technology that enables to promote the distribution of stereoscopic images from the technological side.

For a user to enjoy stereovision, it is necessary for the user to select an optical filter according to the pixel pitch of a monitor he/she uses for the stereovision. Thus, it is essential that an optical filter best suited to a user's display device be supplied without causing trouble to the user. The present invention therefore automatically acquires information, such as the pixel pitch of the monitor, and automatically enables the ordering of an optimum optical filter based on the information.

An arrangement and mechanism for automatically selecting an optical filter suitable for a user's monitor from among a large variety of optical filters is useful. Moreover, because retailers do not usually have enough sales space for a large number of optical filters, electronic commerce where a physical distribution center upon receipt of an order makes a direct delivery of a product to the user will be useful.

A preferred embodiment according to the present invention relates to a method of ordering an optical filter for use in stereovision. This method includes: receiving, when a user places an order for an optical filter utilized to view an image stereoscopically, an order via a network; specifying, via an information processing apparatus that the user places the order with, a display device that achieves the stereovision; and judging whether an optical filter fit for the specified display device can be provided or not. The optical filter for use in stereovision is a means, such as a parallax barrier filter and a lenticular lens, for separating a plurality of parallax images contained in a single image.

When the display device is mounted on the information processing apparatus, the specifying may utilize model information obtained by a function of the information processing apparatus. Moreover, the judging may judge whether the parallax barrier filter fit for a pixel pitch of the display device can be provided or not. This method may further include causing the information processing apparatus to execute a program to acquire the model information, via the information processing apparatus.

Still another object of the present invention is also to provide a technology that enables to promote the distribution of stereoscopic images from the technological side.

For a user to enjoy stereovision, it is necessary to install an optical filter on the monitor and acquire a basic image appropriate for the filter. As a business strategy for spreading the use of optical filters in a short period of time, there is a scenario wherein the users are offered optical filter samples free of charge or at low price so that they can experience the stereoscopic images and then they are asked to purchase regular optical filters. It is to be noted here that a "basic image" is the image of an object to be processed for stereovision in order to display a stereoscopic image.

When adopting a strategy of this kind, there may be cases where two kinds of basic images, namely, one for the sample filter and the other for the regular filter, are required. However, it is desirable that the users can enjoy the stereoscopic images without their taking the trouble to select the basic images fit for the filter. Thus, the present invention is characterized by a feature such that the optical filters distributed to the users are each assigned identification information, and when a user requests an image for use in stereovision, a basic image appropriate for the optical filter corresponding to the identification information will be supplied automatically to the user.

A preferred embodiment according to the present invention relates to a method of providing an image for use in stereovision. This method includes: assigning identification information to an optical filter when the optical filter which is to be mounted on a display device to view an image stereoscopically is distributed to a user; authenticating the user when the user to whom the optical filter is distributed accesses a site on a network by using said identification information; and permitting access of the authenticated user to the image. This method may further include permitting a user, who has presented the identification information, to download a viewer program that supports viewing the image stereoscopically.

Another preferred embodiment according to the present invention relates to a system for providing an image for use in stereovision. This system includes: a client computer having a display device on which an optical filter for viewing the image stereoscopically is mounted; and a providing apparatus which receives identification information assigned for each of the optical filters, and, based on the identification information, transmits to the client computer an image for use in stereovision fit for the optical filter.

Still another preferred embodiment according to the present invention relates to an apparatus for providing an image for use in stereovision. This apparatus comprises: a receiving unit which receives, from a client computer having a display device on which an optical filter for viewing the image stereoscopically is mounted, identification information assigned for each of the optical filers; a first storage which stores the identification information and a type of an optical filter to which the identification information is assigned, in a manner that the identification information is associated with the optical filter type; a specifying unit which specifies the type of an optical filter based on data stored in said first storage and the identification information received; a second storage which stores an image for use in stereovision for each type of the optical filters; a selecting unit which selects from the second storage an image for use in stereovision according to the optical filter type; and a transmission unit which transmits the selected image for use in stereovision to the client computer.

Still another object of the present invention is also to provide a technology that enables to promote the distribution of stereoscopic images. Still another object of the present invention is to provide a technology which enables such promotion of distribution in cooperation with a entity that provides a network-related service.

A preferred embodiment according to the present invention relates to a stereo image providing method. This method is such that a viewer program for generating from parallax images an image displayed stereoscopically through an optical filter is stored in a recoding medium which stores a service start supporting program provided from a predetermined service entity in order to utilize a service via a network, and when a user who acquires the recording medium applies for the service, the user is permitted to access a site where the parallax images are prepared in advance.

Normally for stereovision with depth perception, the right-eye image and the left-eye image must be prepared to produce a parallax. A "parallax image" as used in this patent specification has either of two meanings, namely, one as a generic term meaning a pair of images, such as the right-eye image and the left-eye image, that produces a parallax, and the other meaning any image that causes a parallax. With the former, one parallax image corresponds to one stereoscopic image whereas, with the latter, a plurality of parallax images exist for a single three-dimensional image. A "parallax image" may be a side-by-side form data where a plurality of images constituting the parallax images are arranged side by side. In addition to these, a "parallax image" may be an image from a viewpoint assumed in a stereoscopic image.

An "optical filter" may be a parallax barrier, lenticular lens, shutter glasses or polarizing glasses. An "stereoscopically displayed image" may be data synthesized using parallax images for the observer to have a stereovision so long as it is an image that can be displayed stereoscopically by an optical filter. Moreover, the image meant here is not limited to still pictures but may be moving pictures. A viewer program may generate an image to be displayed stereoscopically in multiplex form in which the right-eye image and left-eye image are arranged alternately in stripes. In this case, the image to be displayed stereoscopically is displayed three-dimensionally through a parallax barrier. Here, an image displayed pseudo-three-dimensionally through an optical filter is called a stereoscopic image. The "stereoscopic image" is not the image data themselves but is ideally the image cast to the user's eyes as a result of being displayed stereoscopically. In other words, a stereoscopic image can be seen when an image to be displayed stereoscopically is viewed through an optical filter.

The service using a network may be a connection service to a network such as the Internet. Thus, a predetermined service entity may be a communication service company such as an Internet service provider (hereinafter referred to as "ISP").

The service may have its own trial period, and access to the site may be permitted during the trial period. Moreover, access to the site may be permitted on condition that the user enters into a contract with the service entity in order to receive the service.

A preferred embodiment according to the present invention relates to an image providing system. This system includes: an authentication information storage which stores authentication information on a user who has applied for a predetermined service utilizing a network; a parallax image providing server which, when there is a request for supply of parallax images from a user who has acquired a viewer program for generating from the parallax images an image displayed stereoscopically through an optical filter, receives the authentication information from the user, and supplies the parallax images after authenticating the user by referring to the authentication information storage.

Still another object of the present invention is to provide an object display technology whereby problems that result from the display of stereoscopic images are foreseen and solved.

A preferred embodiment according to the present invention relates to a stereo image providing method. This method is such that, prior to starting a service of providing a stereoscopic image via a network, a confirmation image that allows a user a stereoscopic vision with naked eyes is provided at a network node involved in the service.

The "network" here may be either a cable or a radio network and may broadly include broadcast media in view of the present conditions where the distinction between communications and broadcasts is growing obscure all the time. An example of the "network node" is an image server structured on the WWW (World Wide Web) using the Internet, but may be a broadcasting station as well.

By implementing this method, the user can check by himself/herself to see whether the image for use in confirmation is properly viewed stereoscopically before he/she receives a stereoscopic image service. The experience of the inventors indicates that users with a significant difference in eyesight between the right and left eyes often have difficulty in recognizing a stereoscopic image even when seen through a parallax barrier or other optical filter. In other words, there are, in fact, users who, due to their eyesight and various other factors, cannot easily obtain stereoscopic vision. In the presence of such users, care must be exercised in providing any charged service.

The inventors also recognizes that such users as have difficulty in having stereoscopic vision through an optical filter tend also to have difficulty in gaining stereoscopic vision with their naked eye, and this knowledge constitutes a basis for the present invention. Since stereoscopic vision with the naked eye does not require any special optical filter or the like, the user can easily decide on his/her aptitude for the service by seeing, for instance, a confirmation image attached to a service application screen.

Moreover, this method is such that effect of the service is not guaranteed or a statement that serves to suppress applying for the service is presented together with the confirmation image for a user who fails to visually recognize the confirmation image as a stereoscopic image.

"Together" here means that such a warning may be literally placed "together" with the confirmation image or separately presented in a related place, such as on a service application screen.

Another preferred embodiment according to the present invention relates also to a stereo image providing method. This method is such that, prior to starting a service of providing a stereoscopic image, a confirmation image for stereoscopic vision by the user's naked eyes is attached in a service application material distributed by a service developing entity. One example of the service application material is any of catalogs for catalog shopping. The above-described effect is obtained if such a catalog with the confirmation image printed therein is distributed.

Still another preferred embodiment according to the present invention relates to an apparatus for providing a stereoscopic image. This apparatus includes: a first storage which stores stereoscopic images; a second storage which stores a confirmation image that allows the user a stereoscopic vision with naked eyes; and a control unit which, when the user applies for a service of providing the stereoscopic image, displays the confirmation image at a user terminal at a scene associated with the application. This apparatus is typically a Web server or an image server in which the Web server is placed in a front end. Though the control unit displays on a user terminal the image for use in confirmation, the entity thereof may be a CPU and a communication protocol function realized thereby which reads out the confirmation image stored in the second storage and sends the read-out confirmation image to a browser, for example, of a user side. This structure can provide the above-mentioned effects as an apparatus.

This apparatus may further include: a confirmation receiving unit which receives notification from the user who has been able to visually capture the confirmation image properly; and an application processing unit which accepts application of the service only for a user who has notified to the effect that the confirmation image was visually captured properly. In this case, the user will apply for the service at his/her own risk, so that a certain level of exemption or disclaimer can be secured as a service entity even when the stereoscopic image cannot be viewed properly by the user at a later stage Still another object of the present invention is to provide a user authentication technology whereby problems that result from the display of stereoscopic image are predicted and resolved.

A preferred embodiment according to the present invention relates to a user authenticating method. This method is such that, prior to access by a user to a predetermined image, information necessary for authenticating the user is displayed at a terminal of the user in a state such that the information cannot be practically interpreted without a predetermined optical filter. The predetermined image may be a stereoscopic image and the predetermined optical filter may be one that realizes a proper stereovision of a stereoscopic image.

For example, in a case where access to the predetermined image is restricted to owners of the optical filer, characters used in user authentication may be displayed in a state such that the characters cannot be practically read without an optical filter. That is, the user is asked to give an answer to the characters, and if his/her answer is correct, the user can be assumed to be an owner of an optical filter, and if not, it can be assumed that the user does not own an optical filter. By this simple method, the user's ownership of an optical filter can be ascertained. A service application screen may be displayed for only those who have given a correct answer thereto. In this case, only the users with a correct environment for stereovision can be selectively offered the service, and those without it can be warned of their existing status. Also, the sales of optical filters can be promoted by leading the non-owners of an optical filter to a sales site of optical filters. A preferential treatment may be given to the owners, and in such a case it encourages the non-owners to purchase their optical filters.

Another preferred embodiment according to the present invention relates to a stereo image providing apparatus. This apparatus is an apparatus that manages a predetermined image, and includes: a request receiving unit which receives from a user a request for access to the image; and an authentication unit which authenticates the user who made the request. This authentication unit presents information necessary for authenticating the user to a terminal of the user in a state such that the information cannot be practically interpreted without a predetermined optical filter. The predetermined image may be a stereoscopic image, and the predetermined optical filter may be one that realizes a proper stereovision of a stereoscopic image.

This apparatus is typically a Web server or an image server in which the Web server is placed in a front end. Though the authentication unit displays on a user terminal the image for use in confirmation, the entity thereof may be a CPU and a communication protocol function realized thereby which reads out the confirmation image stored in the second storage and sends the read-out confirmation image to a browser, for example, of a user side. This structure can provide the above-mentioned effects as an apparatus.

It is to be noted that any arbitrary combination of the above-described structural components, and the above-described expressions converted between method, apparatus, system, recoding medium, computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 18 shows one example of the data structure of a management information database included in the providing apparatus shown in FIG. 17.

FIG. 21 shows an internal structure of an identification information storage.

DETAILED DESCRIPTION OF THE INVENTION

The invention will now be described based on preferred embodiments with reference to the drawings, as appropriate. The preferred embodiments do not intend to limit the scope of the present invention, but exemplify the invention. All of the features and the combinations thereof described in the embodiment are not necessarily essential to the invention.

Terms "image synthesis (synthesizing)" and "image composition (composing)" are used in an interchangeable manner in the patent specification.

First Embodiment

Figure 1:
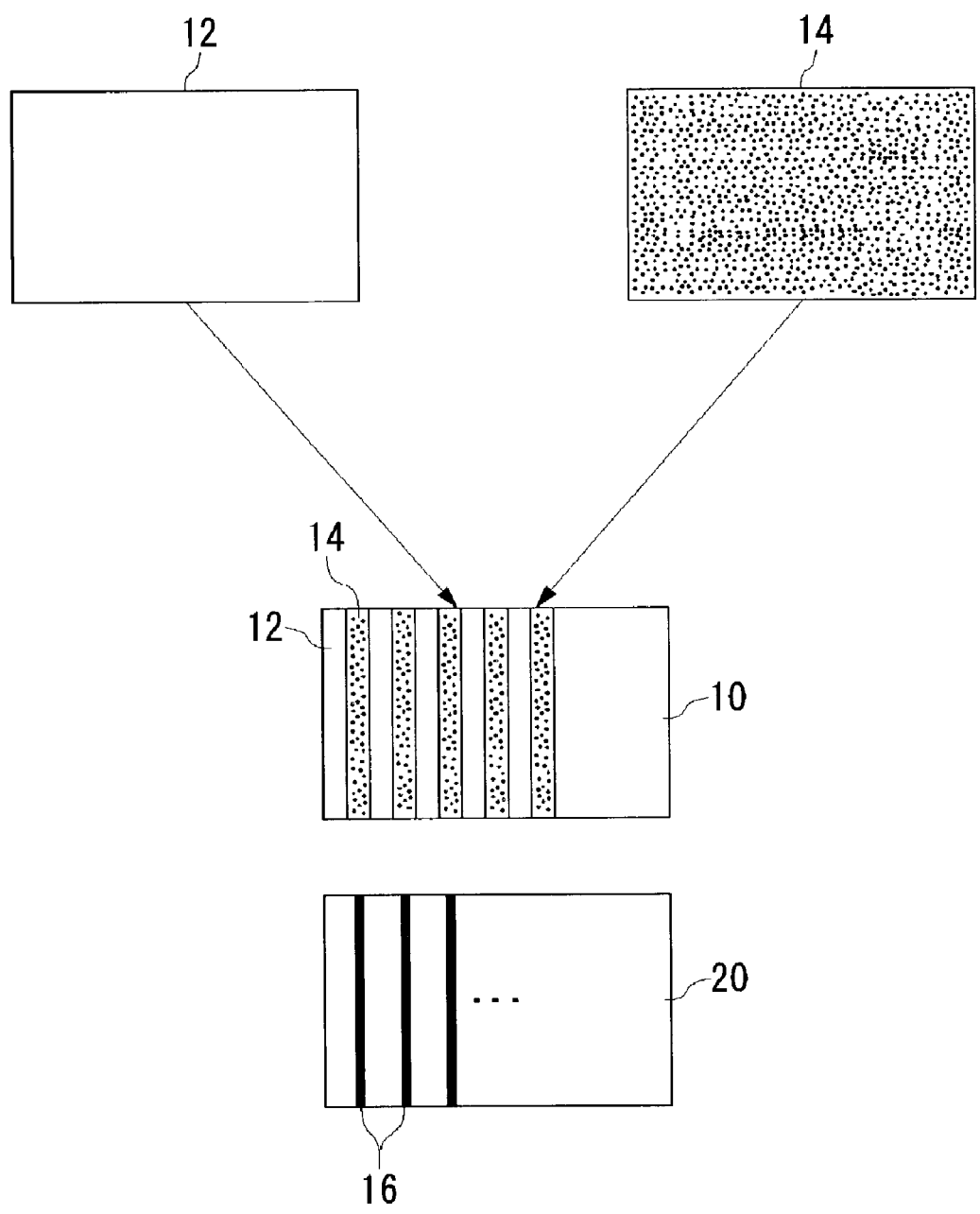
FIG. 1 illustrates a mechanism of stereovision.
Figure 2:
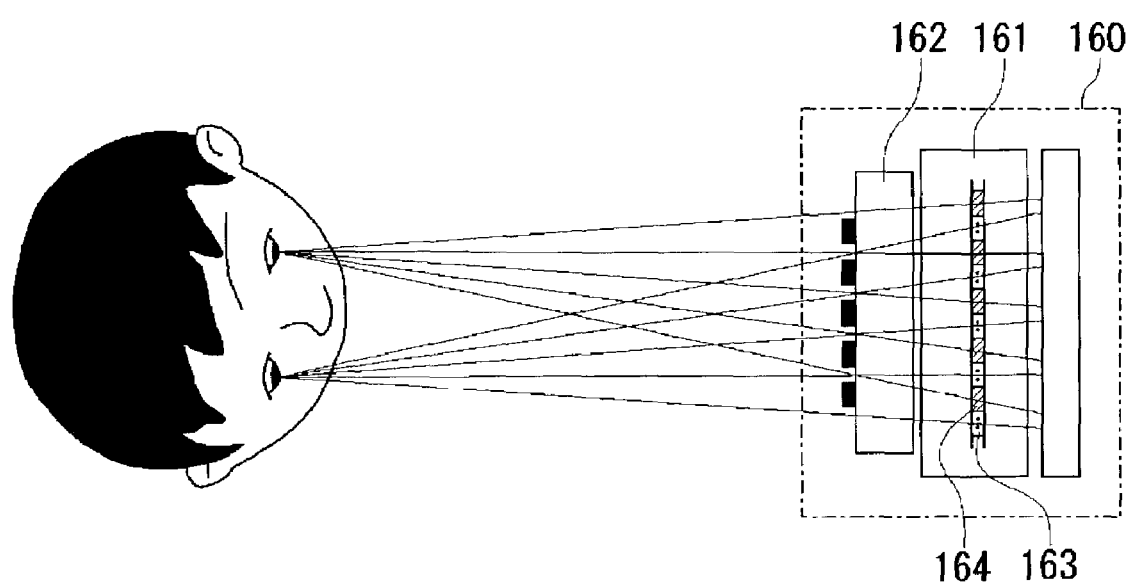
FIG. 2 illustrates the principle of stereovision.

FIG. 2 illustrates the principle according to which a user sees an image three-dimensionally. A stereoscopic display device 160 comprises a liquid crystal panel 161 and a parallax barrier 162, which is a means for image separation for stereoscopic display. The stereoscopic display device 160 in FIG. 2 is a two-eye system which displays a right-eye image 163 and a left-eye image 164 alternately on the liquid crystal panel 161. These images seen through the parallax barrier 162 in this configuration produce a stereoscopic vision as the right-eye image 163 and the left-eye image 164 reach properly the user's right eye and left eye, respectively.

Figure 3:
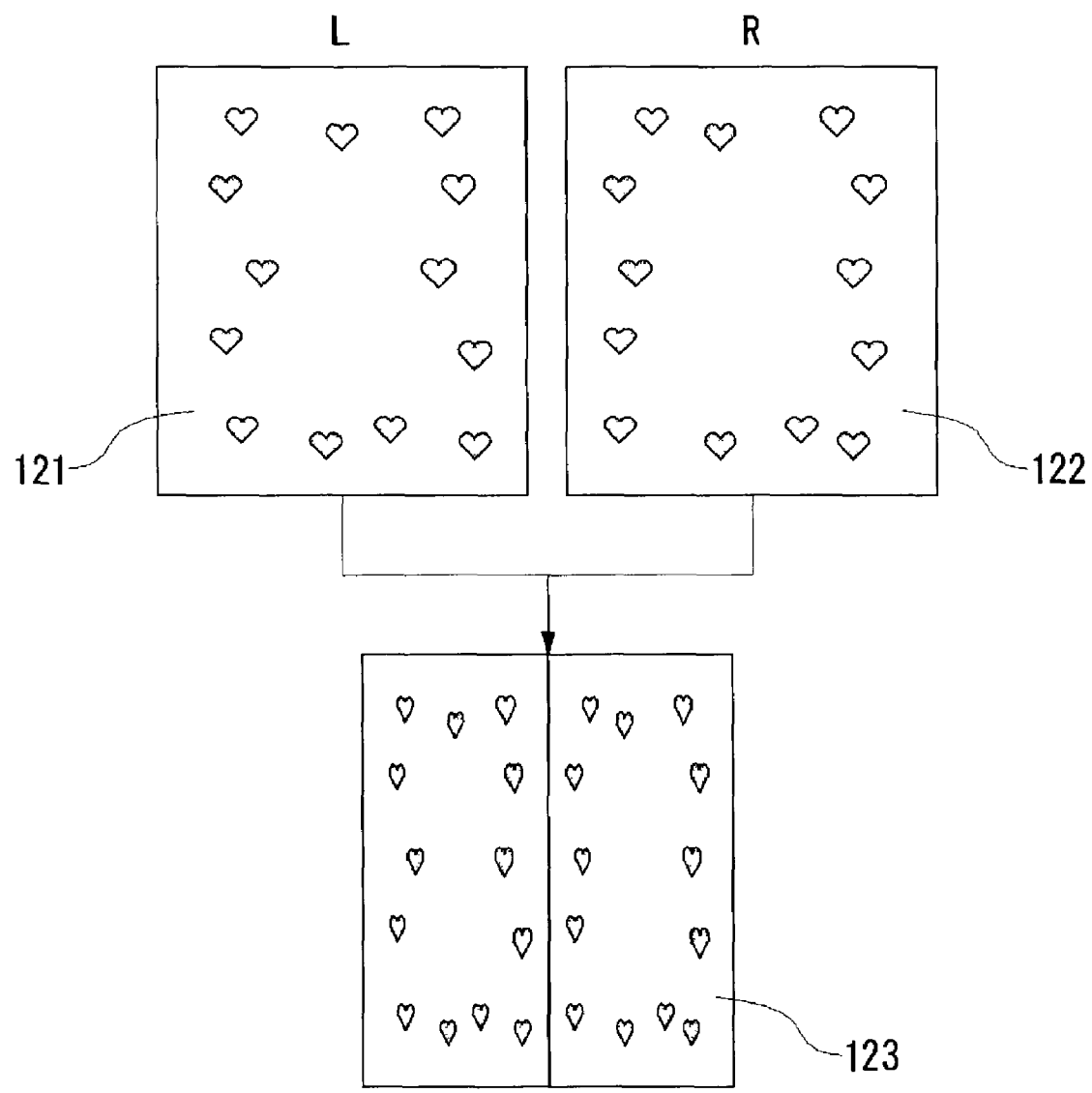
FIG. 3 schematically shows a procedure for generating a stereoscopic image from a left-eye image and a right-eye image.

FIG. 3 illustrates a procedure for generating a stereoscopic image 123 from a left-eye image 121 and a right-eye image 122. As is clear from FIG. 2, only a half of pixels belonging to the left-eye image 121 and the right-eye image 122, respectively, reach the user's eyes. Suppose that the even-numbered stripes on the liquid crystal panel 161 are the pixel stripes for the left eye and the odd-numbered stripes thereof are the pixel stripes for the right eye. Then a stereoscopic image 123 is formed by arranging side by side the pixels in the even-numbered stripes taken from the left-eye image 121 and the pixels in the odd-numbered stripes taken from the right-eye image 122. At the stage of display, however, each of the pixels of this stereoscopic image 123 must be rearranged alternately for the right eye and the left eye. For the sake of simplicity, however, the following description will use a juxtaposed illustration as shown in FIG. 3. In any case, the stereoscopic image 123 is equal in size to the left-eye image 121 or the right-eye image 122 in whole and proves convenient in the distribution and recording of images.

Figure 4:
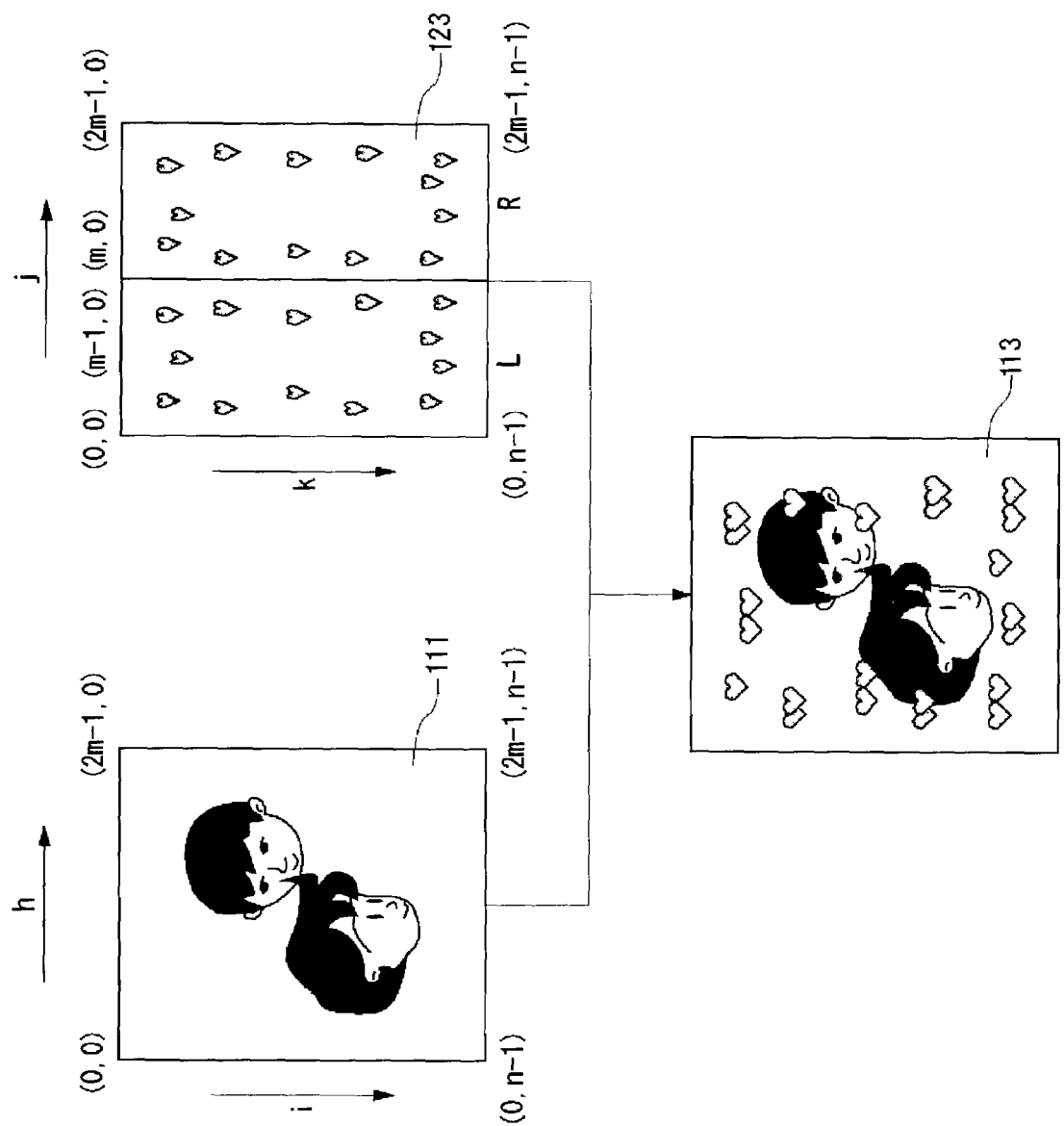
FIG. 4 shows schematically how a first embodiment is applied to the synthesis of a two-dimensional image and a stereoscopic image.

FIG. 4 shows how a first embodiment is applied to the synthesis of a two-dimensional image 111 and a stereoscopic image 123. In FIG. 4, the two-dimensional image 111 is a two-dimensional image captured by a digital camera or the like of a user, for instance, and the stereoscopic image 123 is an image prepared beforehand with the purpose of giving a special effect to the two-dimensional image 111. These two images are equal in size, and the numbers of pixels thereof in the row direction and the column direction are 2m and n, respectively. The stereoscopic image 123 is comprised of heart-shape patterns, which are equivalent to the "object", and the other background.

A process of the two-dimensional image 111 and the stereoscopic image 123 being composed into a finally completed image 113 (hereinafter referred to as "completed image") will be outlined hereinbelow. Namely, when the stereoscopic image 123 is virtually superimposed on the two-dimensional image 111, pixels of domains where the heart shapes in the stereoscopic image 123 exist replace the pixels in the same positions in the two-dimensional image 111, thus creating a state in which the two-dimensional image 111 is overwritten by the hearts in the stereoscopic image 123. At this time, the hearts from the left-eye image 121 replace the pixels of the even-numbered stripes of the two-dimensional image 111 only, whereas, in a similar manner, the hearts from the right-eye image 122 replace the pixels of the odd-numbered stripes thereof only.

Figure 5:
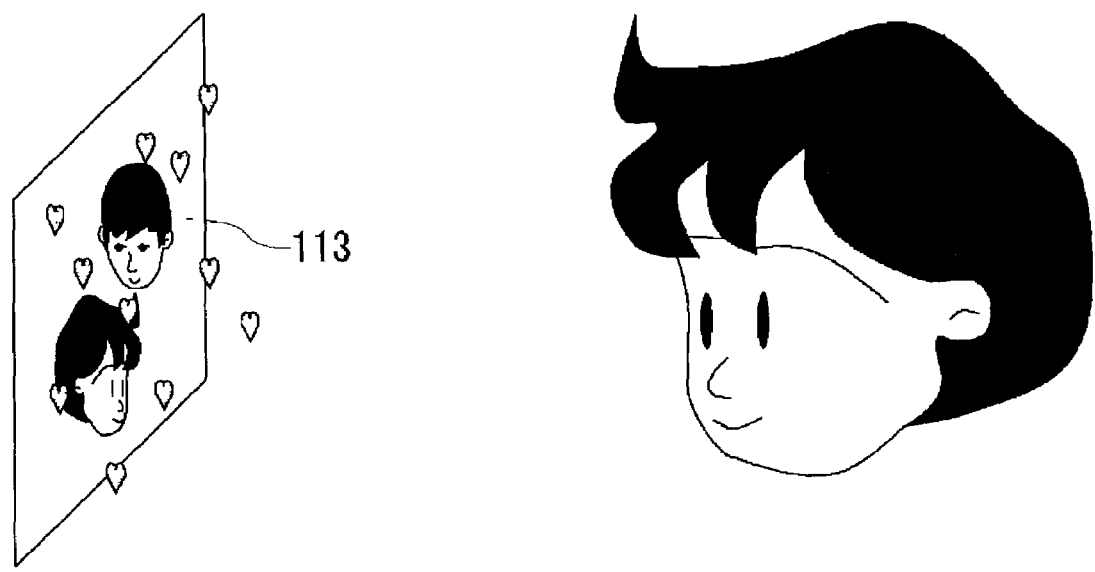
FIG. 5 shows schematically how the thus obtained completed image as a result of the synthesis is observed by a user.

FIG. 5 illustrates how the thus obtained completed image 113 is observed by the user. As shown in FIG. 5, an original photo, which is a two-dimensional image 111, looks planar, but the hearts with varying depths look floating in positions closer to the user from the photo. The greater the displacement that is given to the hearts in the original left-eye image 121 and right-eye image 122, the closer to the user the hearts appear to be. As a result of this processing, the user can decorate stereoscopically any two-dimensional photo taken by himself/herself, so that photos having a high degree of entertainment and creativity according to his/her preference can be generated.

The stereoscopic image 123 is not limited to the heart shape or other patterns. It may be the frame area of a photo, for instance. Then, a special photo with the frame area projecting toward a viewer can be realized. In this case, when the completed image 113 is displayed on the liquid crystal panel 161, an effect is attained as if the user were seeing a real framed photo.

Figure 6:
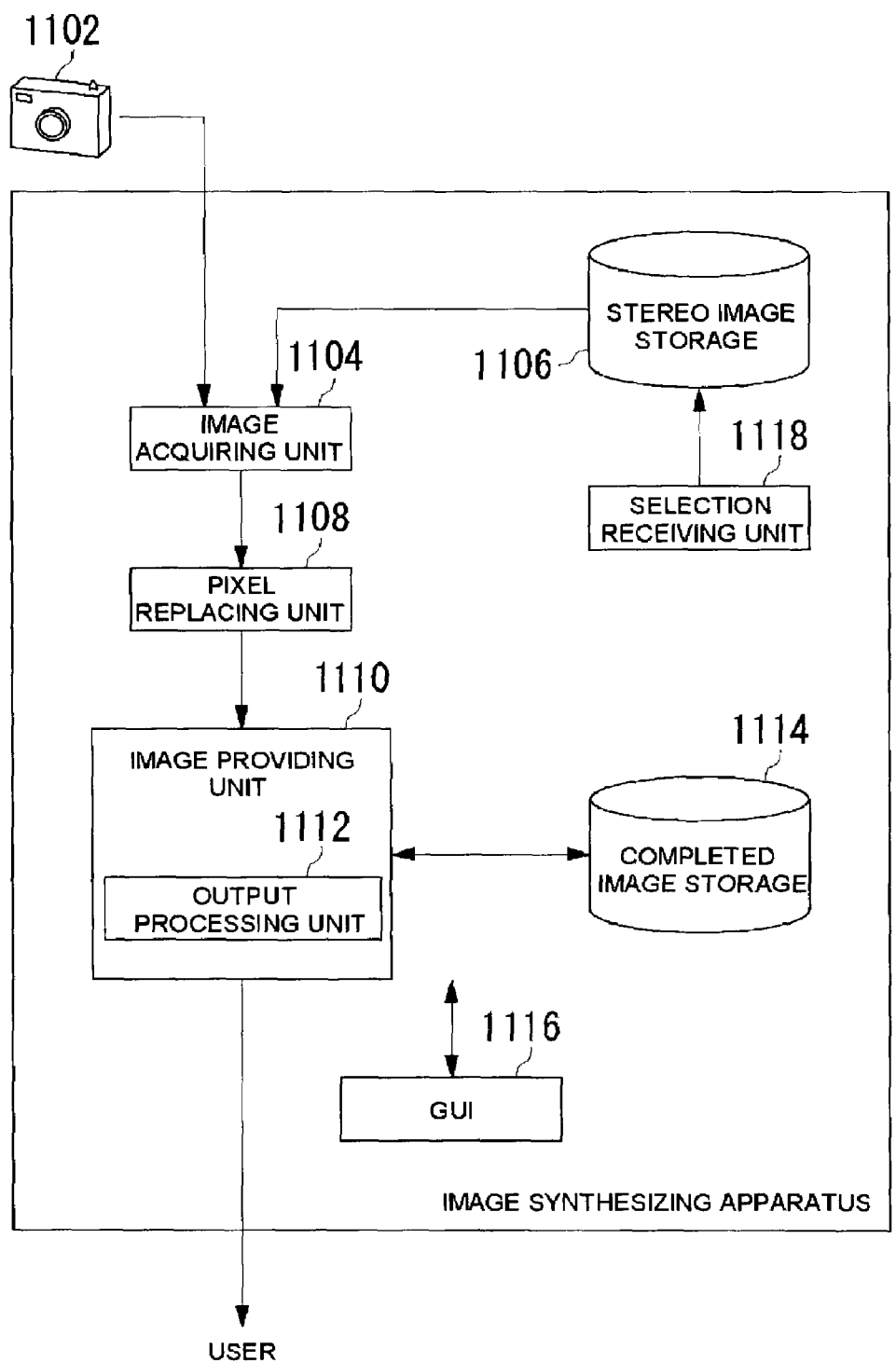
FIG. 6 shows a structure of an image synthesizing apparatus according to a first embodiment.

FIG. 6 shows a structure of an image synthesizing apparatus 1100 according to a first embodiment. The image synthesizing apparatus 1100 may be realized at a local point, such as a user's personal computer, and may be a server through which the user receives the image composition service via a network. The structure thereof may be realized by hardware only, software only, or a combination thereof. The structure is represented here as a block diagram of the functions that are realized eventually. For example, each component may be realized by a CPU and a program with image synthesizing function. The components shown in FIG. 6 are therefore to be understood as functions and thus do not necessarily correspond to hardware components.

The image synthesizing apparatus 1100 includes an image acquiring unit 1104 which acquires a two-dimensional image from a digital camera 1102 and acquires a stereoscopic image from a stereo image storage 1106, a pixel replacing unit 1108 which performs an image composition processing by inputting the thus acquired images, and an image providing unit 1110 which inputs a completed image after the synthesis and presents it to the user.

In the stereo image storage 1106, there are prepared a multiplicity of patterns and frames as stereoscopic images. The user selects a stereoscopic image to be synthesized with his/her own two-dimensional image by instructing his/her choice to a selection receiving unit 1118. The selected stereoscopic image is then supplied to the image acquiring unit 1104. The image providing unit 1110 includes an output processing unit 1112, which outputs the completed image, in a way as desired by the user, by storing it in a completed image storage 1114, sending it attached to electronic mail to a destination desired by the user or inserting it in a homepage managed by the user and so forth.

A GUI (Graphical User Interface) 1116 communicates with the user. Namely, the GUI 1116 performs a task of communications in the user's exchange with the image synthesizing apparatus 1100 when the user inputs a two-dimensional image from the digital camera 1102, selects his/her choice in the selection receiving unit 1118, specifies an output mode to the image providing unit 1110 and so forth.

Figure 7:
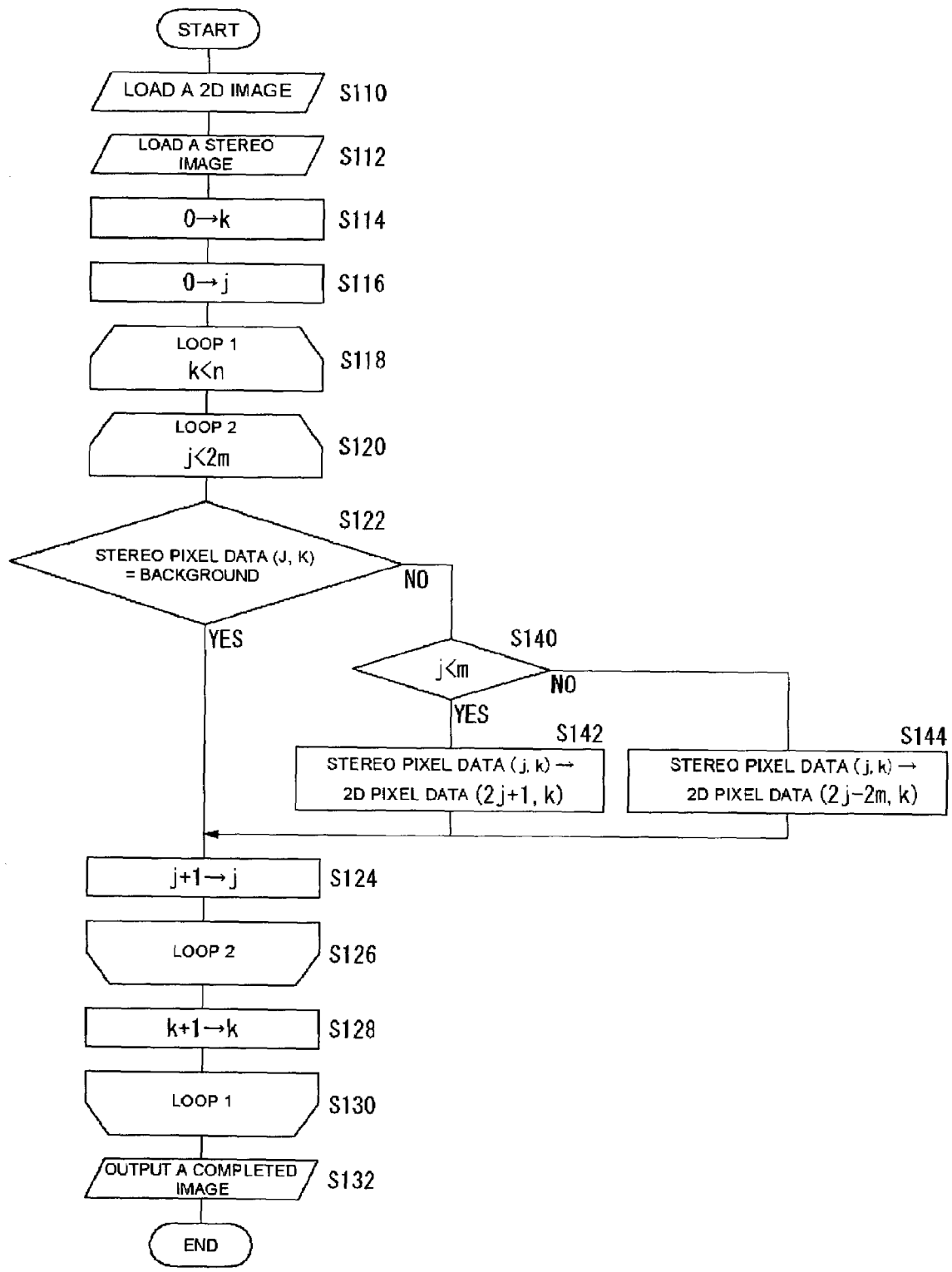
FIG. 7 shows a procedure for image composition processing by the image synthesizing apparatus shown in FIG. 6.

FIG. 7 shows a procedure for image composition processing by the image synthesizing apparatus 1100. The description here concerns only a processing related to the composition of an image by the replacement of pixels involved. The parameters h, i, j and k in FIG. 7 represent, respectively, the column number of pixels in a two-dimensional image, the row number thereof in the two-dimensional image and the column number of pixels in a stereoscopic image and the row number thereof in the stereoscopic image as shown in FIG. 4.

Referring to FIG. 7, loading of a two-dimensional (2D) image (S110) and a stereoscopic image (S112) into the image acquiring unit 1104 is carried out first. Then, a parameter k is set to 0 (S114), and similarly a parameter j is set to 0 (S116). As long as k<n, a loop 1 (S118 to S130) is executed continuously. Moreover, while j<2m, a loop 2 (S120 to S126) is executed continuously. This shows that the processing is carried out for all the pixels of the stereoscopic image.

Firstly, whether the pixel data (0,0) of the stereoscopic image are contained in the "background" or not is judged (S122). If the pixel data (0,0) are contained (YES of S122), nothing is done to that pixel and j is incremented (S124). The processing in the column direction is performed in the loop 2 until j=2m. On the other hand, the processing in the row direction is performed in the loop 1 until k=n.

Returning to S122, when the pixel data of the stereoscopic image in question are not contained in the "background" (NO of S122), namely, when the pixel is contained in any of the hearts, which are the object, the processing will proceed to S140. At this point, the sizes of j and m are compared. As shown in FIG. 4, when j<m (YES of S140), this pixel is contained in the original left-eye image and therefore the pixel data (j,k) of the stereoscopic image replace the pixel data (2j+1,k) that exist in the corresponding position of the two-dimensional image (S142). For "NO" at S140, namely, when the pixel in question is contained in the original right-eye image, the pixel data (j,k) of the stereoscopic image replace the pixel data (2j−2m,k) of the original two-dimensional image (S144). By implementing the above-described processing, the pixels belonging to the heart-shape portion in the stereoscopic image replace the corresponding pixels in the right-eye image or the left-eye image. When this processing has been executed through the loop 1, increment of the parameter k (S128) and loop 2, a completed image 113 will be generated and outputted finally (S132).

Figure 8:
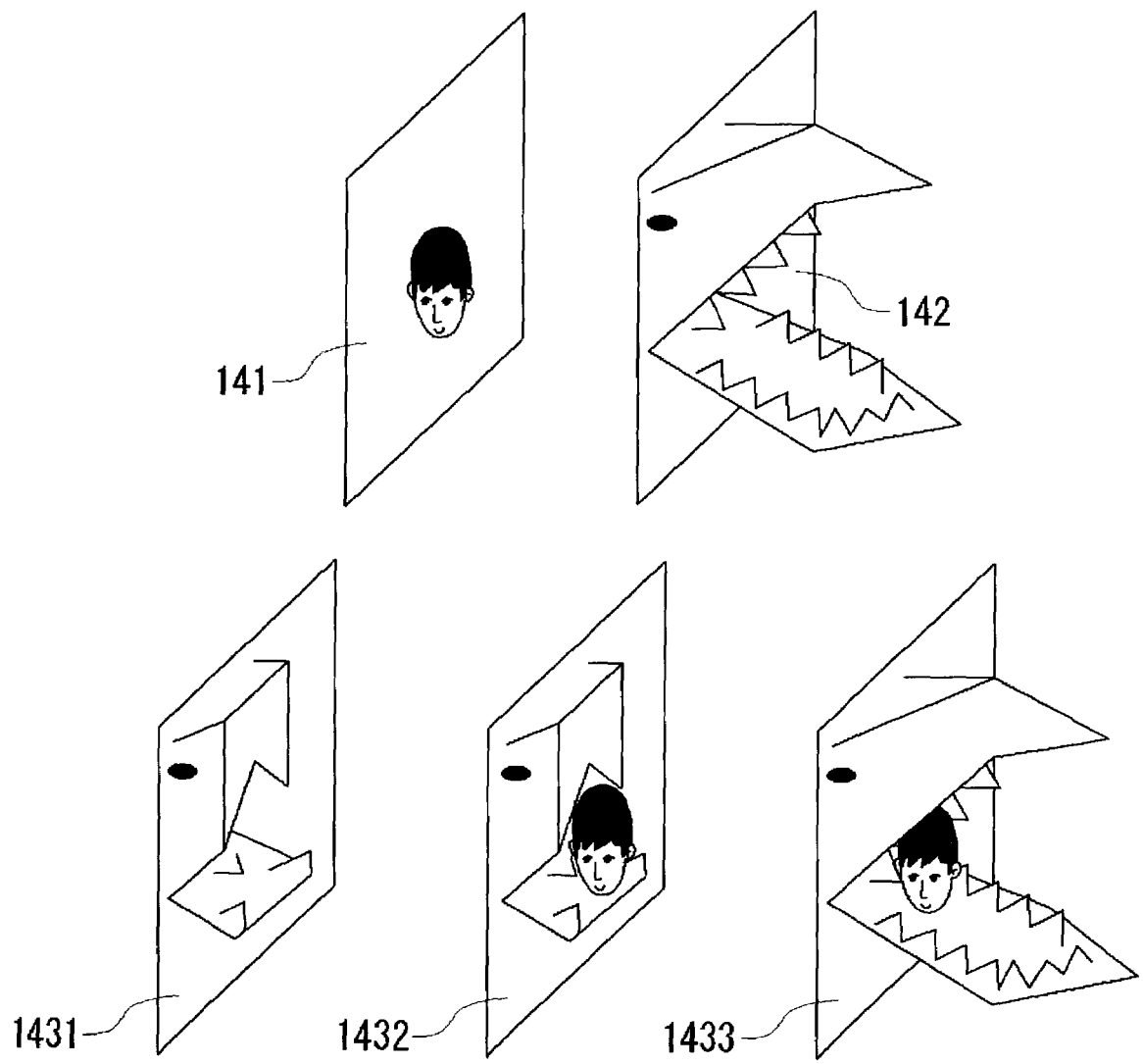
FIG. 8 shows schematically how an image is composed according to another embodiment.

FIG. 8 schematically illustrates how an image is composed according to another embodiment. A two-dimensional image 141 is a photo taken by the user which shows a human face. On the other hand, a stereoscopic image 142, which is to be composed with the two-dimensional image, is a three-dimensional representation of a dinosaur with its mouth open. In this case, a stereoscopic photo of a person being devoured by a dinosaur is generated through the synthesis of the two images.

In this embodiment, too, attention is directed to the depth of the two-dimensional image 141 and the stereoscopic image 142. A completed image which looks as natural as practicable is composed and obtained by starting with the farthest image and overwriting closer images one by one on the image generated prior thereto. Here, parts of the stereoscopic image 142 more distant than the assumed depth of the two-dimensional image 141 are first drawn, then a human face, which is a marked region in the two-dimensional image 141, is overwritten on a distant image, and finally parts having less depth than the human face is selected from the stereoscopic image 142 and overwritten on the thus far generated image.

In FIG. 8, images to result from these three stages of processing are illustrated as an initial image 1431 which is the distant view, an intermediate image 1432 where the processing is done up to the human face, and a completed image 1433 which is a final result. As known in the technique of computer graphics, the initial image 1431 is an image representing the dinosaur in the stereoscopic image 142 when cut off by a virtual plane standing at the depth where the human face exists.

Here, in synthesizing the human face with the initial image 1431, overwriting of the entire two-dimensional image 141 will result in the loss of all the initial image 1431. Therefore, the overwriting is done in a manner such that the human face only, which is the marked region in the two-dimensional image 141, is extracted. Thus, in the processing of the two-dimensional image 141, a region smaller than the initial image 1431 is selected.

Figure 9:
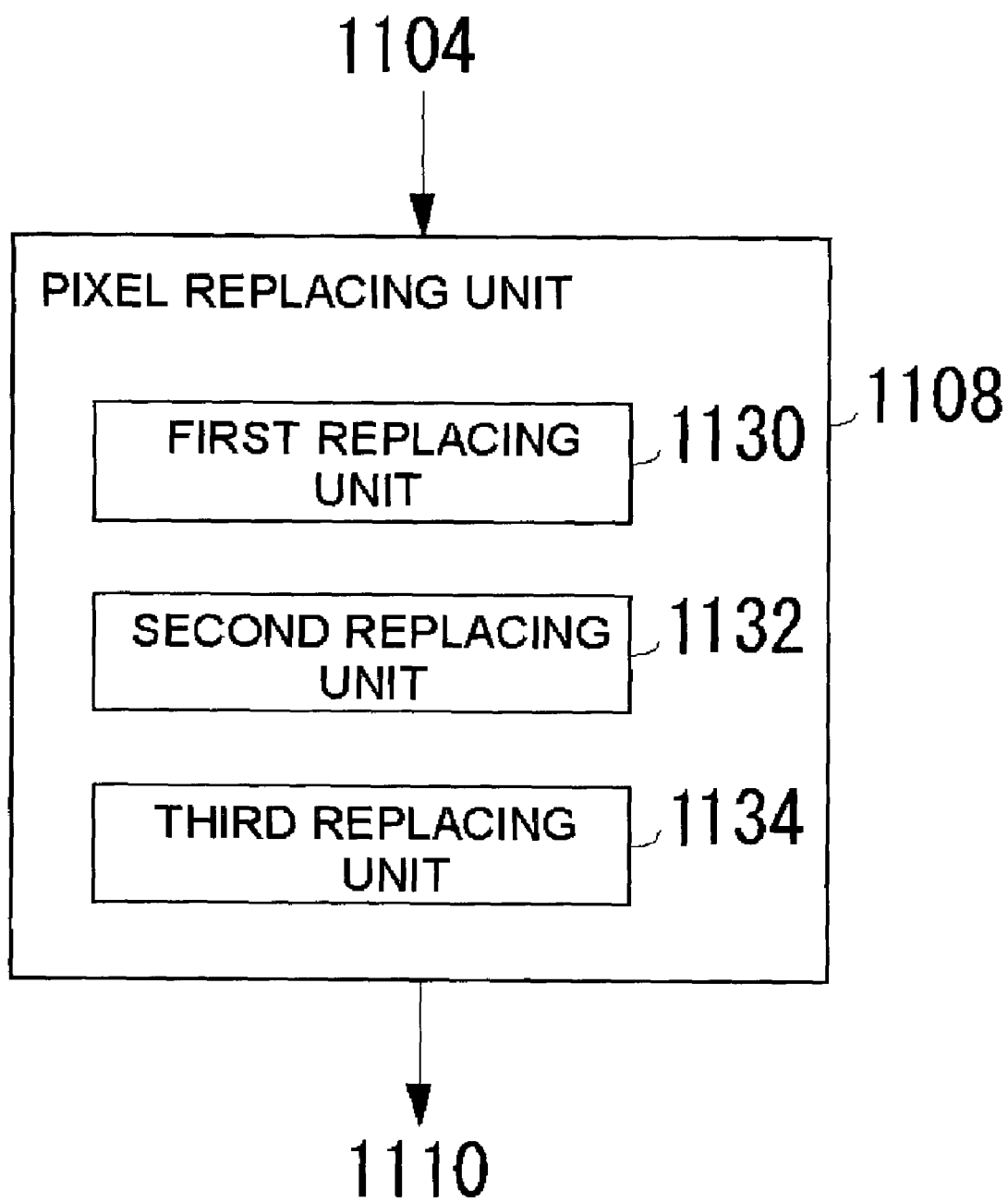
FIG. 9 shows a structure of a pixel replacing unit that realizes the embodiment of FIG. 8.

The structure of an apparatus necessary for the processing shown in FIG. 8 is nearly the same as one shown in FIG. 6, but differs in that the pixel replacing unit 1108 comprises three stages of processing. FIG. 9 shows a structure of a pixel replacing unit 1108 according to this preferred embodiment. A first replacing unit 1130 generates an initial image 1431 by selecting pixels of the stereoscopic image 142 to be reproduced in back of the two-dimensional image 141. A second replacing unit 1132 generates an intermediate image 1432 by selecting a marked region from the two-dimensional image 141 and superposing it on the initial image 1431. A third replacing unit 1134 generates a completed image 1433 by selecting pixels of the stereoscopic image 142 to be reproduced in front of the two-dimensional image 141 and superposing them on the intermediate image 1432. The completed image 1433 thus generated is outputted to an image providing unit 1110.

Figure 10:
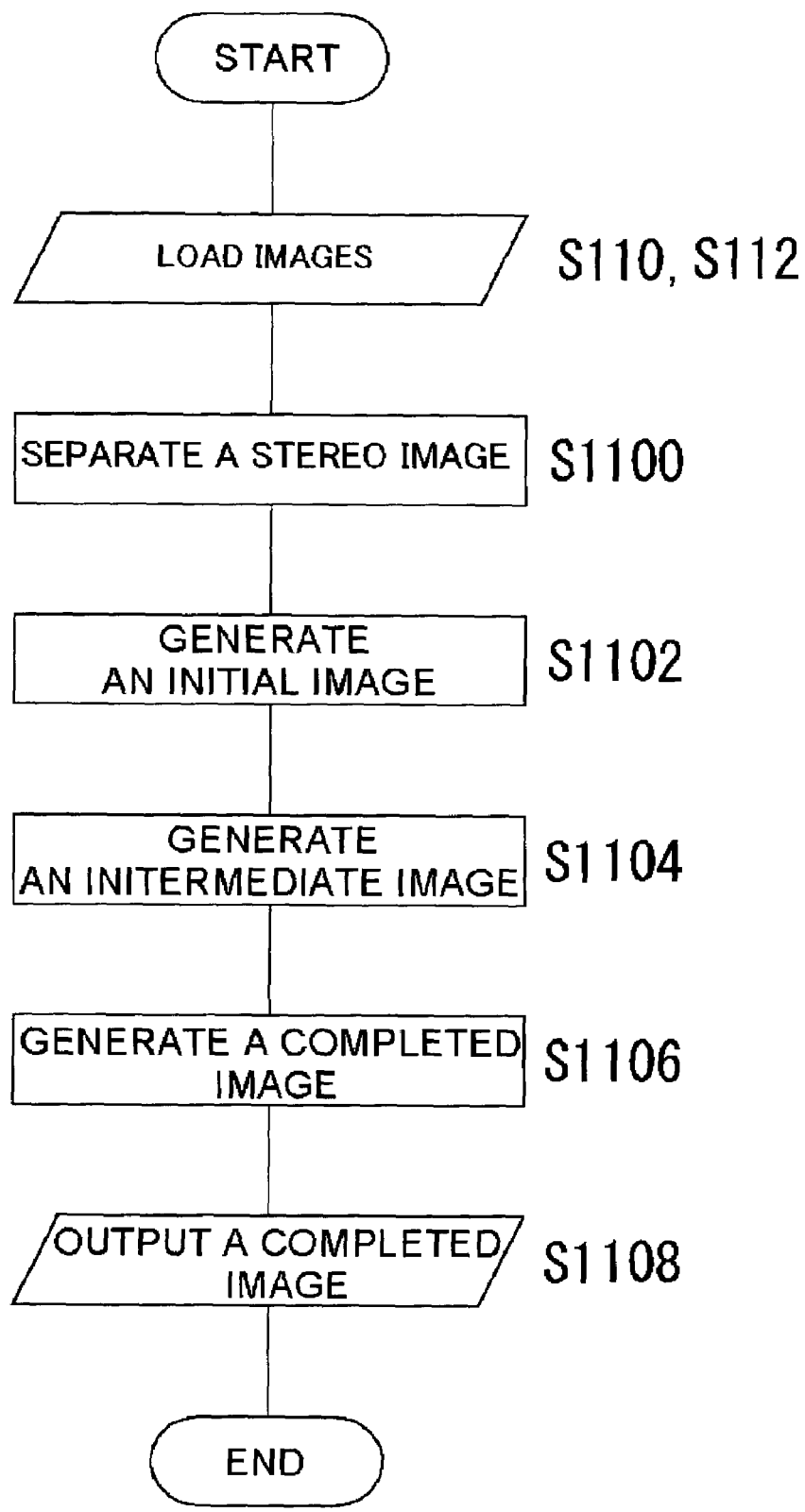
FIG. 10 shows a procedure for image composition processing according to the embodiment shown in FIG. 8.

FIG. 10 shows a procedure for image composition processing according to this preferred embodiment. This procedure, however, is an extension of the procedure explained in FIG. 7 with reference to the previous embodiment. For the simplicity of description, therefore, the processing will be only outlined hereinbelow. Referring to FIG. 10, a two-dimensional image 141 and a stereoscopic image 142 are loaded first (S110, S112). Then the stereoscopic image 142 is divided into the background image and the foreground image by a plane assumed at the depth of the 2-D image 141 (S1100). Then the pixel replacing unit 1108 generates an initial image 1431 (S1102), an intermediate image 1432 (S1104) and a completed image 1433 (S1106). Thereafter, the completed image 1433 is outputted from the image providing unit 1110 for a desired use (S1108).

Figure 11:
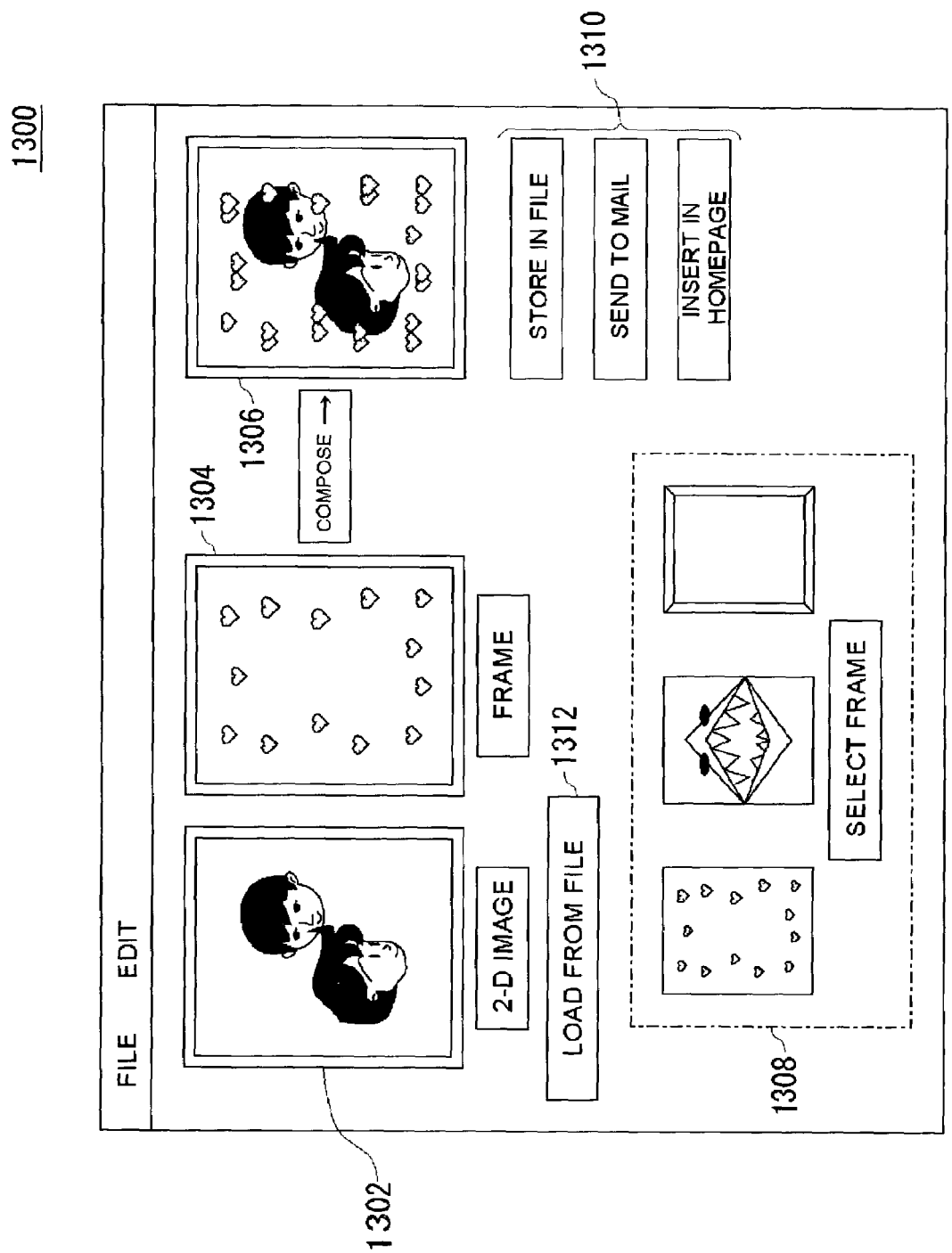
FIG. 11 shows a GUI of an image synthesizing apparatus according to any one of the present embodiments.

FIG. 11 shows a display image of a GUI 1116 when an image is actually composed by an image synthesizing apparatus 1100 according to the above-described preferred embodiments. A screen 1300 displayed by the GUI 1116 includes an area 1302 which displays a two-dimensional (2-D) image to be processed, an area 1304 which displays a stereoscopic image to be synthesized therewith as a frame, and an area 1306 which previews a completed image resulting from the synthesis thereof. Also displayed on the screen are a button 1312 with which the user loads the two-dimensional image from a file, a specifying area 1308 from which the user selects a stereoscopic image as the frame, and a group of buttons 1310 with which the user instructs the output mode for a completed image generated. The group of buttons 1310 is, for instance, provided with buttons for storing the completed image in a file, sending it attached to electronic mail, and inserting it in the user's homepage. It goes without saying that these functions of the GUI 1116, which have been described as incorporated in the image synthesis apparatus 1100 with reference to FIG. 6, may also be realized by remote functions, such as CGI (Common Gateway Interface) possessed by a Web server, via a network.

Figure 12:
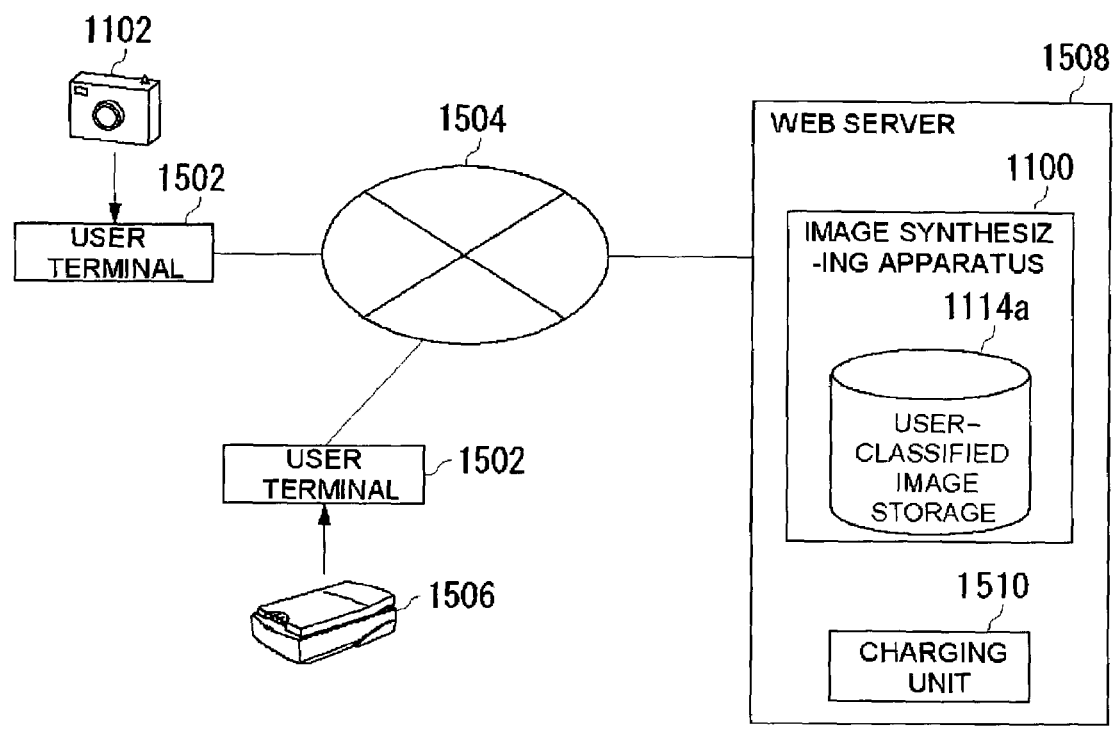
FIG. 12 shows a general structure of a network system including an image synthesizing apparatus according to any one of the present embodiments.

FIG. 12 shows a general structure of a network system 1500 including an image synthesizing apparatus 1100 according to the present embodiments. This network system 1500 includes user terminals 1502 and a Web server 1508, which are connected via the Internet 1504. A user terminal 1502 acquires a two-dimensional image from an image input device, such as a digital camera 1102 or a scanner 1506, and transmits the acquired image to the Web server 1508.

The Web server 1508 adds a stereoscopic frame or some other special stereoscopic effect to the received two-dimensional image, then transmits the resulting image to the user or stores it in an internal storage device, and awaits an access by the user. The Web server 1508 has within itself not only the functions necessary for a Web server, such as httpd (hyper text transfer protocol daemon), but also the functions of an image synthesizing apparatus 1100 according to any of the above-described embodiments.

The image synthesizing apparatus 1100 has a structure similar to that shown in FIG. 6, but the completed image storage 1114 is extended to a user-classified image storage 1114a, where completed images are stored for each of individual users. Thereby, each of the users is not required to have a completed image locally, but can see a desired completed image whenever necessary by accessing the Web server 1508. Thus, to the users, this system can be thought of as an electronic stereoscopic album placed in a remote location.

The Web server 1508 further includes a charging unit 1510. The charging unit 1510 generates charging information from various stereoscopic image providing services, image composing service and image storage service for the users, and supports account settlement by an electronic settlement system (not shown).

The present invention has been described based on embodiments which are only exemplary. It is understood by those skilled in the art that there exist other various modifications thereto. Such modifications will be described hereinbelow.

In the above-described embodiments, the two-dimensional image itself is not converted to a stereoscopic image. However, it is possible to convert the two-dimensional image to a stereoscopic image. One way is to copy the two-dimensional image and then produce a parallax similar to that of a stereoscopic image by artificially creating displacements between the corresponding pixels of the two images. This method will widen the range of service by providing not only the ready-made stereoscopic images like a frame but also stereoscopic appearance to parts of a two-dimensional image captured by the user's digital camera. In a case when a two-dimensional image is artificially converted to a stereoscopic image, there are caused a variety of depth relations. For example, it is also possible to generate a complex completed image which is comprised of a stereoscopic image, two-dimensional image, stereoscopic image and two-dimensional image in this order from the background.

The present embodiments have been described using the stereoscopic image in a two-eye system, but it goes without saying that similar image composition is possible for stereoscopic images that have more than two view points.

According to the present embodiments, the two-dimensional image and the stereoscopic image are assumed from the start to be equal in size, but they may naturally be different in size. In such a case, an edit function that enables the user to specify the position or select the number of pixels in cutting parts off a two-dimensional or stereoscopic image may be added as a function of the GUI 1116 as shown in FIG. 11. Particularly where the number of pixels for display is fixed, a structure may be adopted such that the number of pixels is selectable according to the model number or the like of a display equipment.

Moreover, the frame, which is ready-made in FIG. 11, may be formed freely by selecting the position of an object and the degree of stereoscopic effect.

In the above-described embodiments, functions of the image synthesizing apparatus 1100 are realized by a local environment, such as the user's personal computer, or by a remote environment via a network, such as a Web server. In addition to these, the image synthesizing apparatus 1100 may be designed as an equipment to be installed in outdoor or recreational facilities, for instance. In that case, data on a completed image may be stored not only in a storage device like a hard disk drive but also in other devices with built-in memory, such as memory cards and portable telephones.

Second Embodiment

Figure 13:
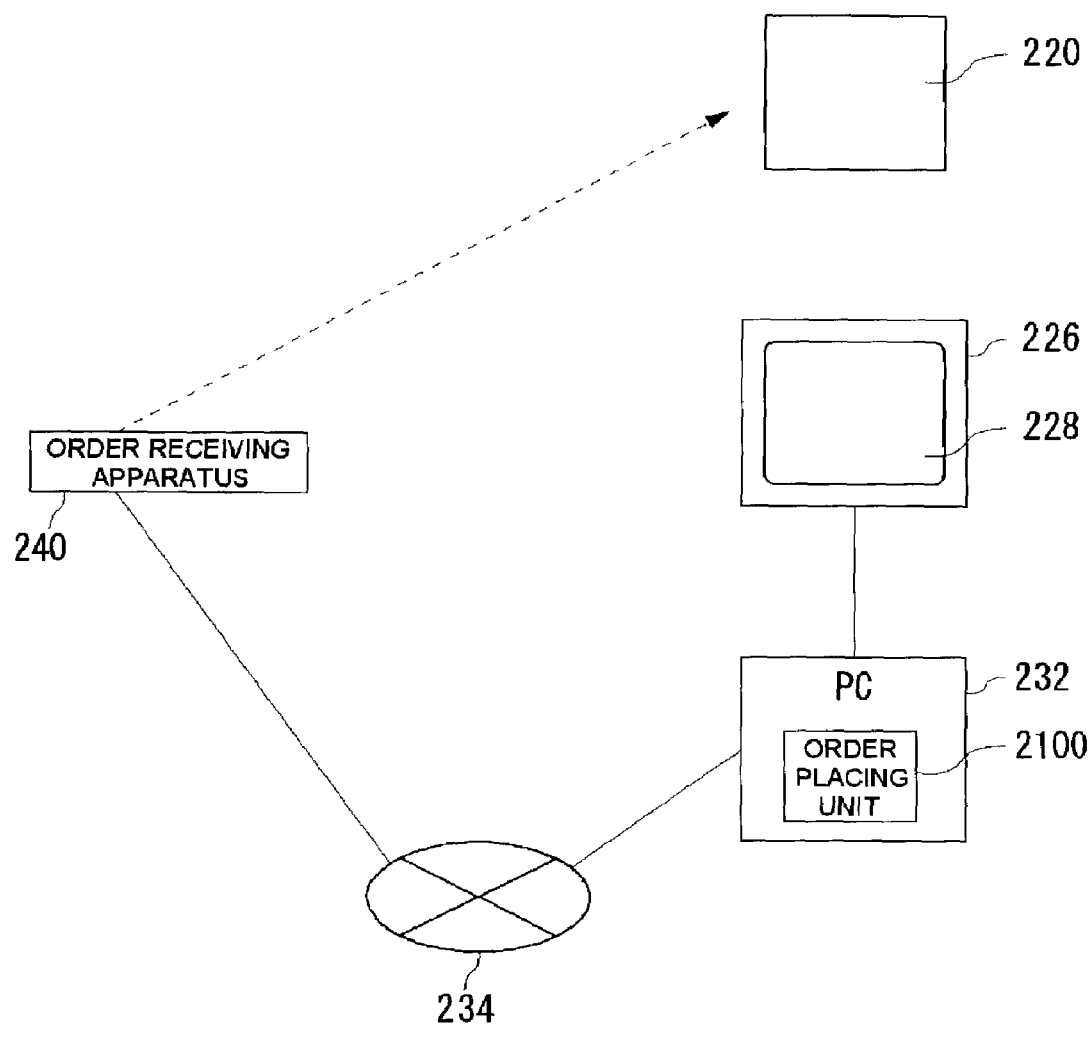
FIG. 13 shows a structure of a distribution system according to a second embodiment.

FIG. 13 shows a structure of a distribution system 250. A personal computer 232 (hereinafter referred to as PC 232), which is comprised of a CPU, a memory, a hard disk drive and so forth, provides the user with a variety of functions by executing programs. A monitor 226 displays image data from the PC 232 on a display area 228. The display area 228 is a unit which displays images by combinations of a plurality of pixels. An LCD (Liquid Crystal Display), PDP (Plasma Display Panel) or the like serves as said unit. The display area 228 is not limited to these, and any type of display device serve the purpose so long as stereoscopic vision is possible thereby.

In this structure, an optical filter 220 is installed so that it covers a part or the whole of the display area 228. After the installation, the position thereof is fine-adjusted by an arbitrary method, and once an optimum display position is achieved, the user can enjoy seeing stereoscopic images.

An order placing unit 2100 recognizes the model or type of the monitor 226 and judges whether or not there is any optical filter 220 which can be installed on the monitor 226. If there is an optical filter 220 for use with the monitor, the order placing unit 2100 transmits an order for the optical filter 220 to an order receiving apparatus 240 over a network 234, such as the Internet. Thereby, the user can easily order an optical filter 220 without checking on the model or type of the monitor 226. This order placing function is realized by the PC 232 where a program is executed.

By establishing a mechanism for the purchase of the optical filter 220 which does not give the users much trouble, it can be expected that the popular use of the optical filter 220 be spread quickly. For the growth of a business, it is important to quickly spread the use of merchandise involved among users. Therefore, this kind of distribution system will contribute to the growth of the stereoscopic image market.

Figure 14:
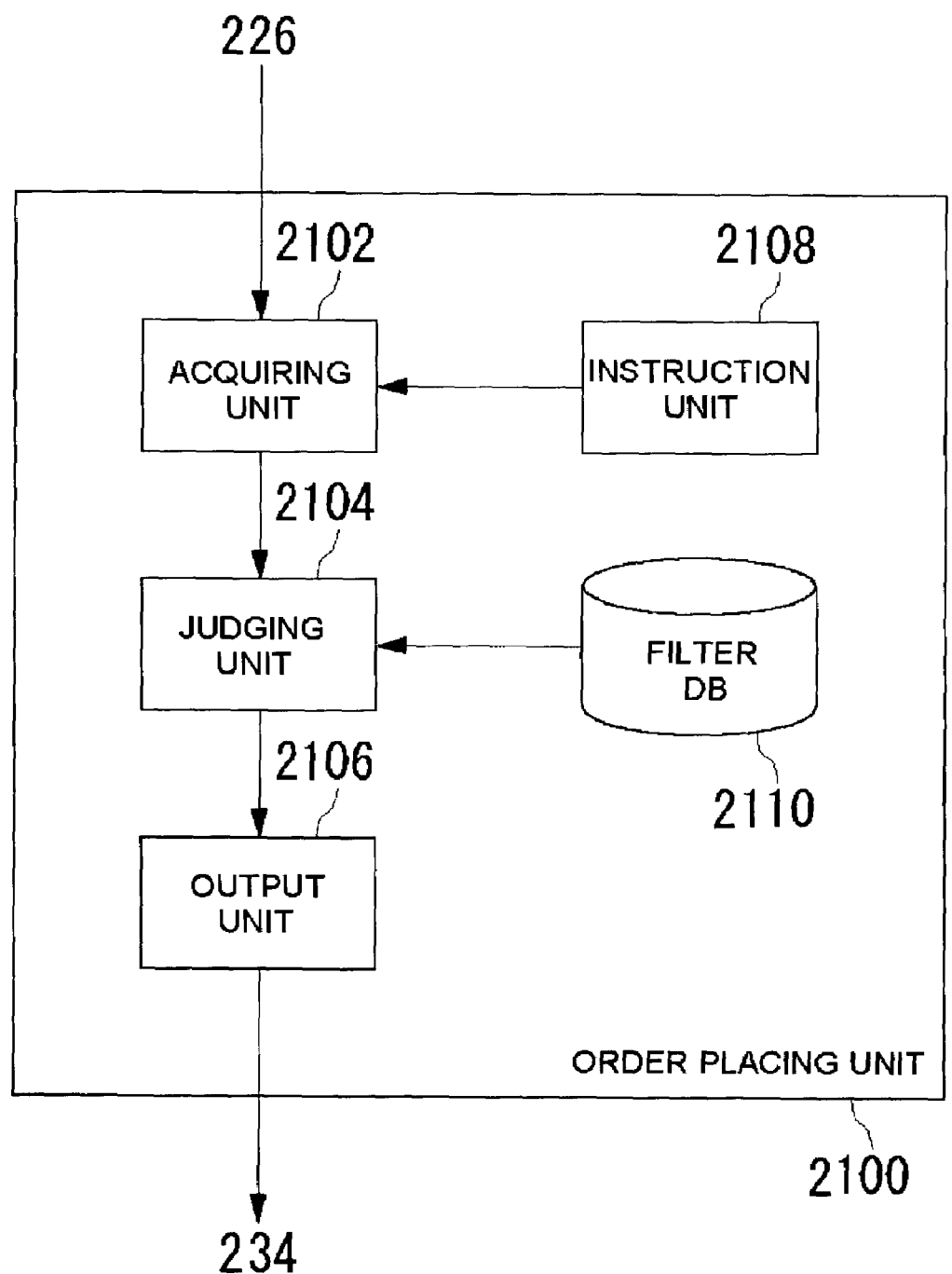
FIG. 14 shows an internal structure of an order placing unit included in the distribution system shown in FIG. 13.

FIG. 14 shows a structure of the order placing unit 2100. An acquiring unit 2102 acquires model identification information from the monitor 226. The "identification information" may be any information that identifies the monitor 226; it may be either a single code identifying the monitor 226 or a combination of such information as model name, type number, maker name and manufacturing date. The acquiring unit 2102 may utilize a function with which the PC 232 automatically recognizes the model when the monitor 226 is connected to the PC 232. Moreover, the acquiring unit 2102 may automatically load the identification information on the monitor 226 which is already contained in the PC 232. When the identification information on the monitor 226 cannot be acquired automatically, the acquiring unit 2102 asks the user to directly input the identification information on the monitor 226. An instruction unit 2108 is a unit which receives an instruction from the user to start an ordering operation. For example, the instruction unit 2108 instructs the acquiring unit 2102 to start the ordering operation when the user has pressed a button displayed on the monitor 226 that specifies start of the ordering operation.

A filter database 2110 stores information on an optical filter 220 in relation to monitor identification information. A judging unit 2104 judges whether there is an optical filter 220 appropriate for the user's monitor 226, based on the identification information given from the acquiring unit 2102 and information from the filter database 2110. When an optical filter 220 appropriate for the monitor 226 is available, the judging unit 2104 notifies the user of the fact and displays on the monitor 226 a screen asking the user about his/her decision to order the optical filter 2102 or not. And when an optical filter 220 appropriate for the monitor 226 is not available, the judging unit 2104 notifies the user of the fact and discontinues its operation. An output unit 2106, when it has received an instruction from the user to place an order, transmits both the user information, such as user's name and address, and the identification information on the monitor 226 to the order receiving apparatus 240 via a network 234.

Figure 15:
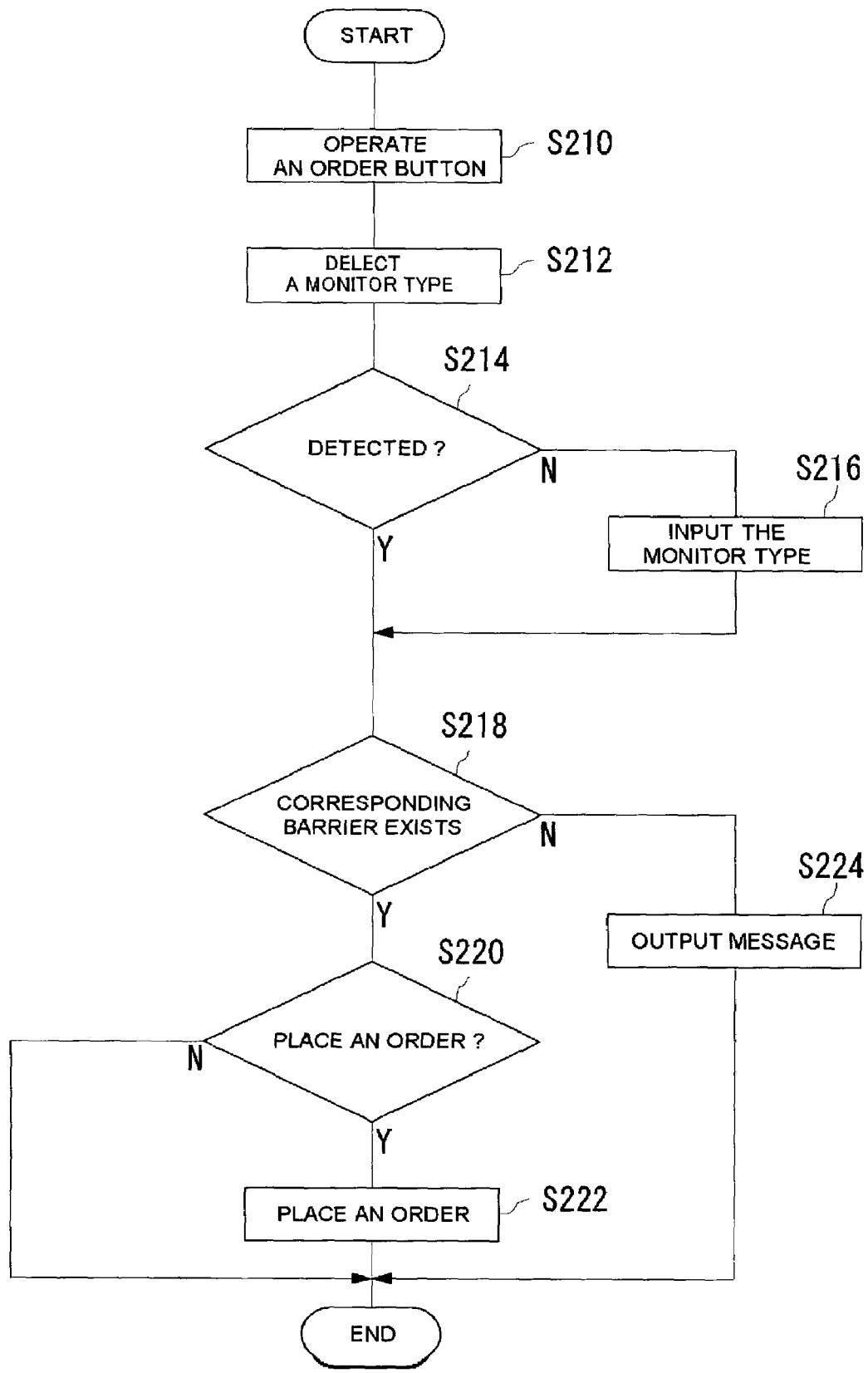
FIG. 15 shows a flowchart of an order processing according to the second embodiment.

FIG. 15 shows a flowchart of an order processing. The order placing unit 2100 receives an instruction from the user to start an ordering operation (S210). Upon receipt of the instruction, an operation to detect the identification information on the monitor 226 is started (S212). When the identification information is detected automatically (Y of S214), whether or not there is an optical filter 220 appropriate for the monitor 226 is judged (S218). When the identification information cannot be detected (N of S214), the user is requested to input the information for identification of the monitor 226 (S216).

When an optical filter 220 appropriate for the monitor 226 is available (Y of S218), the user is notified to that effect and is asked about his/her decision to order it or not (S220). When the instruction is for ordering (Y of S220), the optical filter 220 is ordered (S222). When there are no instructions for ordering (N of S220), processing is discontinued. When an optical filter 220 appropriate for the monitor 226 is not available at S218 (N of S218), the user is notified of the fact (S224) and the processing is discontinued. It is to be noted here that another process may be added in any of the above stages wherein the user is asked to confirm the information on the monitor detected automatically or the one which has been hand-inputted by the user. In such a case, a structure may be such that the ordering process is allowed to go forward upon user's confirmation.

For example, a seller of the optical filter 220 arranges such that a program to realize the functions of the order placing unit 2100 can be downloaded from a sales site provided on the Internet. The user who desires to purchase the optical filter 220 downloads the program and runs it on the PC 232. Thereby, the user can easily order an optical filter 220 without the trouble of searching one appropriate for the monitor 226 by himself/herself.

The present invention has been described based on embodiments which are only exemplary. It is understood by those skilled in the art that there exist other various modifications to the combination of each component and each processing described and that such modifications are encompassed by the scope of the present invention.

As a first example of such modifications, there is one that relates to the order placing unit 2100. The judging unit 2104 and the filter database 2110 shown in FIG. 14 are structured in the PC 232, but they may be provided in the order receiving apparatus 240 instead. In this case, the acquiring unit 2102 transmits acquired identification information on the monitor 226 to the judging unit provided within the order receiving apparatus 240 over a network 234. The judging unit makes judgments by referring to the filter database. Thus, the amount of data required for the program to realize the functions of the order placing unit 2100 can be reduced. Moreover, when an optical filter corresponding to a new monitor is to be newly registered, it is only necessary to update the filter database provided within the order receiving apparatus 240, so that the distribution system for the optical filter is maintained easily.

As a second example of such modifications, there is a structure wherein a WWW (world wide web) browser to be run on the user PC stores the identification information on the monitor as an environment variable. In this case, such a processing as acquisition of the identification information or judgment on an optical filter may be carried out on the side of the order receiving apparatus. Upon receipt of a user's request for an order processing, the acquiring unit provided in the order receiving apparatus side requests the WWW browser on the user PC to transmit the identification information and acquires it as an environment variable. Based on the identification information received, the judging unit judges whether or not there is an optical filter appropriate for the user's monitor. By implementing this scheme, the user can order an optical filter without the trouble of executing a program on his/her PC to acquire and transmit the identification information as described above.

Third Embodiment

Figure 16:
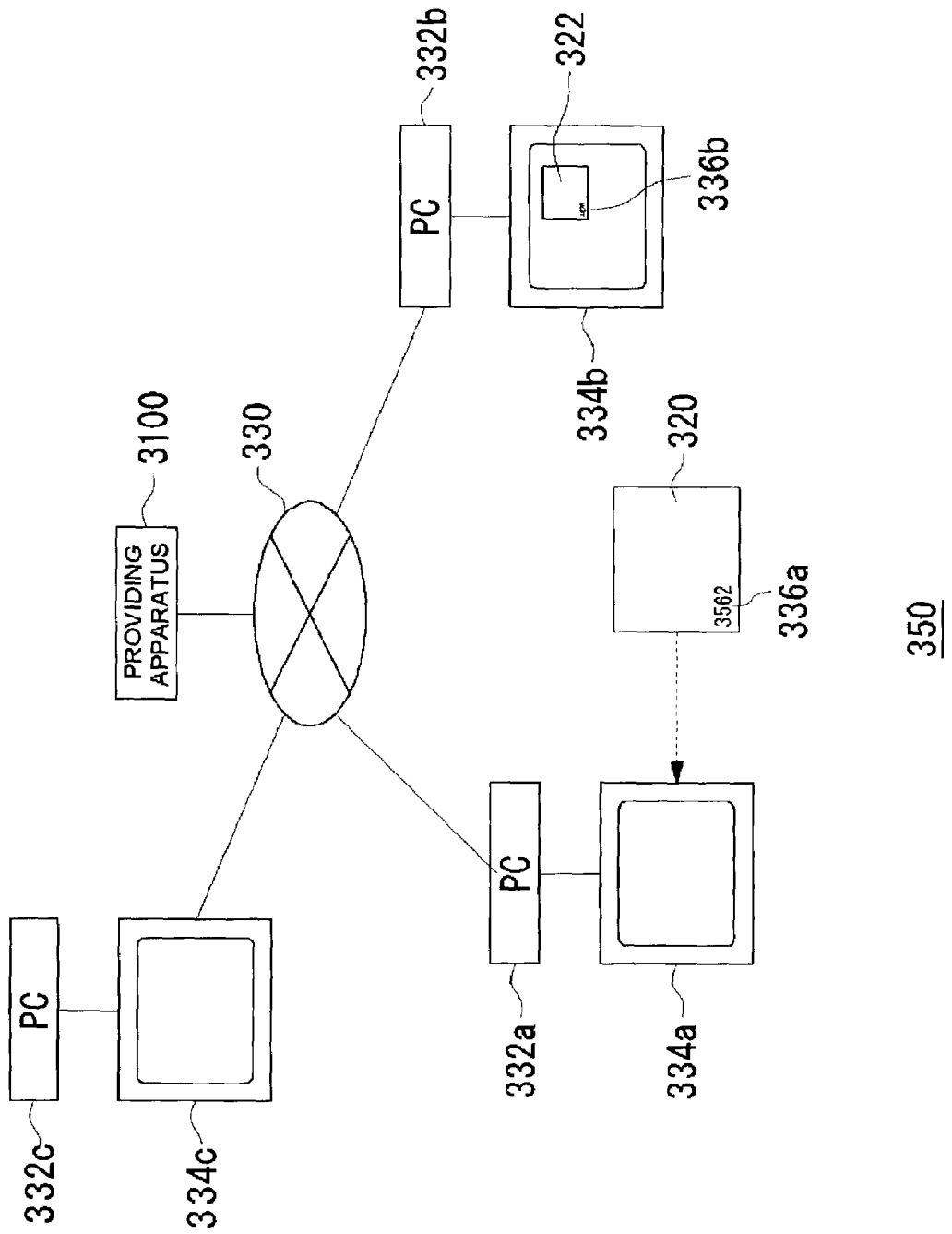
FIG. 16 shows a structure of a providing system according to a third embodiment.

FIG. 16 shows a structure of a system 350 which provides images for use with stereoscopic vision. A personal computer 332 (hereinafter referred to as PC 332) is comprised of a CPU, a memory, a hard disk drive and so forth. The PC 332 provides the user with a variety of functions by executing programs. A monitor 334 outputs displays based on image data from the PC 332. The monitor 334, which is a unit that displays images by combinations of pixels, is an LCD (Liquid Crystal Display), PDP (Plasma Display Panel) or the like. A PC 332a is connected to a monitor 334a to which an optical filter 320 is attached. A PC 332b is connected to a monitor 334b to which an optical filter 322 is attached. A PC 332c is connected to a monitor 334c.

An optical filter 320, which is a regular filter designed in accordance with pixels, size and other factors of the monitor 334a, has identification information 336a given to itself. For example, the identification information 336a may be described in a partial area of the optical filter 320 or may be listed in the printed matter delivered together with the optical filter 320. The optical filter 322, which is delivered to the user as a sample for his/her experience of stereoscopic vision, is smaller in size than the regular optical filter 320. The sample optical filter 322 also has identification information 336b given to itself.

A providing apparatus 3100 provides images to the PC 332 over a network 330, such as the Internet. When requesting the supply of an image, the user transmits the identification information assigned to his/her filter to the providing apparatus 3100 from his/her PC 332. Based on the identification information received, the providing apparatus 3100 provides a basic image appropriate for the filter possessed by the user. For example, the providing apparatus 3100 supplies a basic image for use with the regular filter to the PC 332a and a small-size basic image for use with the sample filter to a PC 332b. Moreover, the providing apparatus 3100 supplies a normal image that does not contain a plurality of parallax images to a computer 332c which belongs to the user having no identification information. Thus, there is no need of, on the user's part, selecting a basic image appropriate for the optical filter by himself/herself.

Many sites that offer image contents authenticate the users by assigning IDs to them individually. In the present embodiment, the providing apparatus 3100 can distinguish between the user to whom a stereoscopic image is to be provided and the user to whom a normal image is to be provided, at the time of authentication by the use of filter identification information as the user ID. The user, on the other hand, can use this image providing system 350 without reluctance because the entry method to the site is not different from the conventional practice. Furthermore, with the identification information serving also as the access right to the site, the user has no need to register his/her subscription to the site after purchasing an optical filter, thus making this system highly convenient.

Moreover, information on the users themselves are not needed because the providing apparatus 3100 can manage the state of its usage based on the identification information assigned to the filters. For example, the charge for the use of the providing apparatus 3100 may be included in the price of the optical filter, so that the user need not pay the charge therefor with his/her credit card or the like. Thus, the user is not required to put his/her private information like his/her credit card number on the network. This system thus features greater security against leakage of private information.

Figure 17:
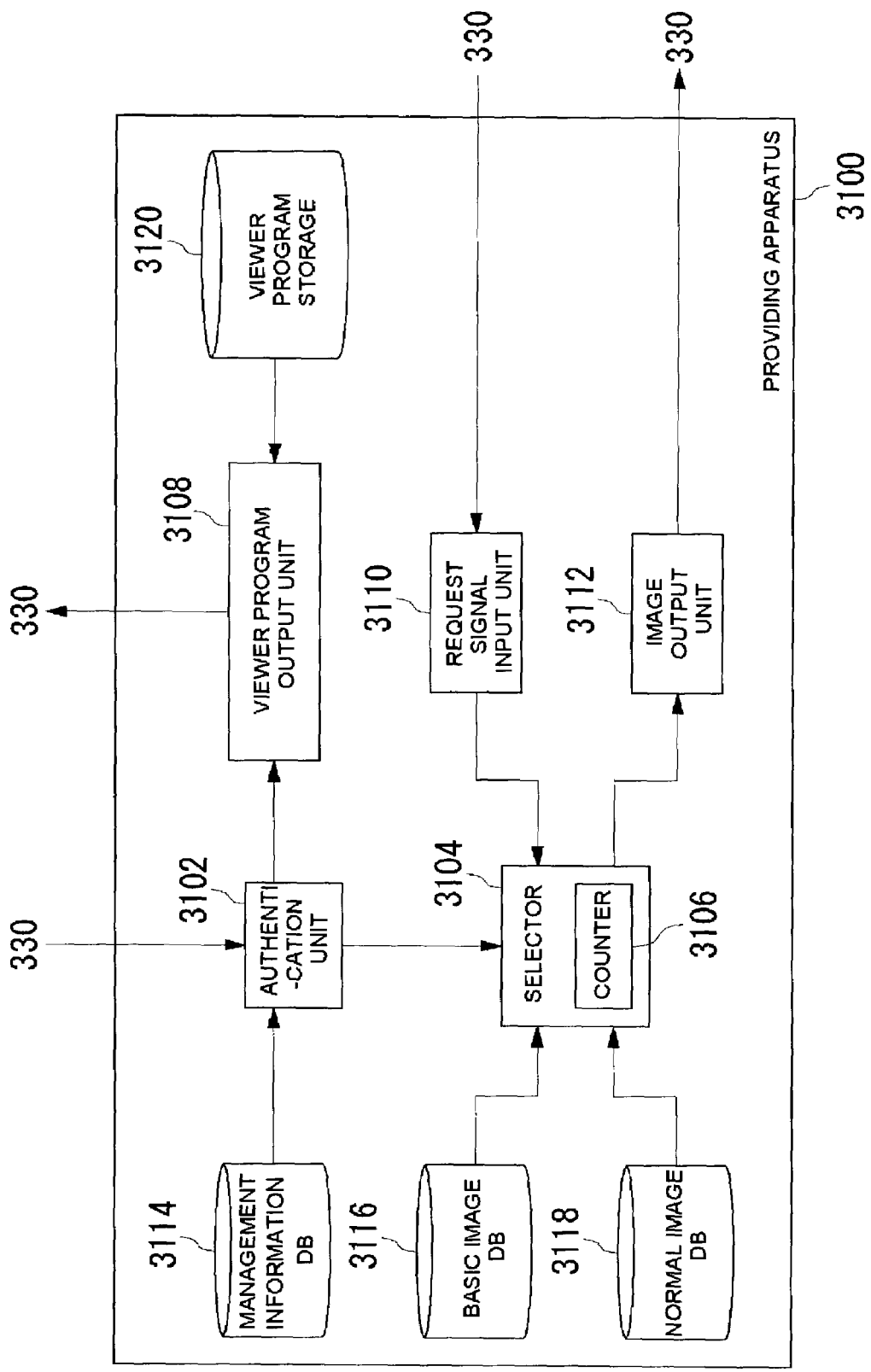
FIG. 17 shows an internal structure of a providing apparatus included in the providing system shown in FIG. 16.

FIG. 17 shows a structure of the providing apparatus 3100. A management information database 3114 stores data on identification information assigned to optical filters, types of filters, state of viewer program distribution and so forth. The types of filters are regular filters, sample filters and the like. An authentication unit 3102 receives identification information from a PC 332 via the network 330 and authenticates the user based on the identification information received and the data stored in the management information database 3114. When the authentication is successful, the authentication unit 3102 notifies a selector 3104 accordingly and at the same time specifies the type of image data to be sent to the PC 332. For example, when the type of the filter is "sample", the authentication unit 3102 instructs the selector 3104 to supply the basic image for use with the sample filter.

A basic image database 3116 stores the basic images for stereoscopic vision for different types of filters. For example, the basic image database 3116 stores two kinds of basic image, one for the regular optical filter and the other for the sample optical filter, for a certain image. A normal image database 3118 stores normal images for the images held in the basic image database 3116.

A request signal input unit 3110 receives signals requesting images from the users. Each of these signals is a signal specifying an image desired by the user, so that it is, for instance, the name or file name of the image. A selector 3104 selects an image specified by the user from either of the basic image database 3116 and the normal image database 3118 according to the type of filter used. An image output unit 3112 transmits the image data selected by the selector 3104 to the PC 332 via the network 330. A counter 3106 is a unit that counts the number of images supplied for each identification information. For example, where a user is using a sample optical filter, the number of the basic images to be supplied to the user can be restricted according to the above number of images.

A viewer program storage 3120 stores a viewer program designed to facilitate stereoscopic vision. The program changes the pixel arrangement of an image supplied in such a way as to make its stereoscopic vision possible, and makes fine adjustment of the display position of the basic image displayed on the monitor. For stereoscopic vision using an optical filter, it is necessary that the basic image and the optical filter are superposed on each other in a predetermined positional relationship. In the present embodiment, therefore, a program for adjusting the display position of the basic image is supplied to the user who purchases an optical filter. This will relieve the user of much trouble in making adjustment, thus reducing the stress which may accompany the introduction of stereoscopic vision. A viewer program output unit 3108 transmits a viewer program to the user's PC 332. For example, the viewer program output unit 3108 transmits the viewer program when the user has accessed the providing apparatus 3100 for the first time.

FIG. 18 shows one example of data structure of the management information database 3114. An identification information column 3150 holds identification information given to different optical filters. A filter type column 3152 holds types of filters. In the present embodiment, stored as the type of filter are two kinds of data, namely, "regular" for regular filters and "sample" for sample filters. A providable number column 3154 holds the numbers of basic images which can be supplied to the users. In the present embodiment, the presentable number of basic images for regular filters has no limit, but that for sample filters is limited to "5" at most.

A provided number column 3156 holds the numbers of basic images which have thus far been provided to the users. These numbers are counted by the counter 3106 described with reference to FIG. 17. A viewer program output flag column 3158 holds flags showing the status of supply of the program designed to facilitate stereoscopic vision. The flag is changed when the viewer program output unit 3108 transmits a viewer program to the PC 332. In the present embodiment, "1" represents a status wherein a viewer program has already been provided, and "0" a status wherein a viewer program has not yet been provided.

Figure 19:
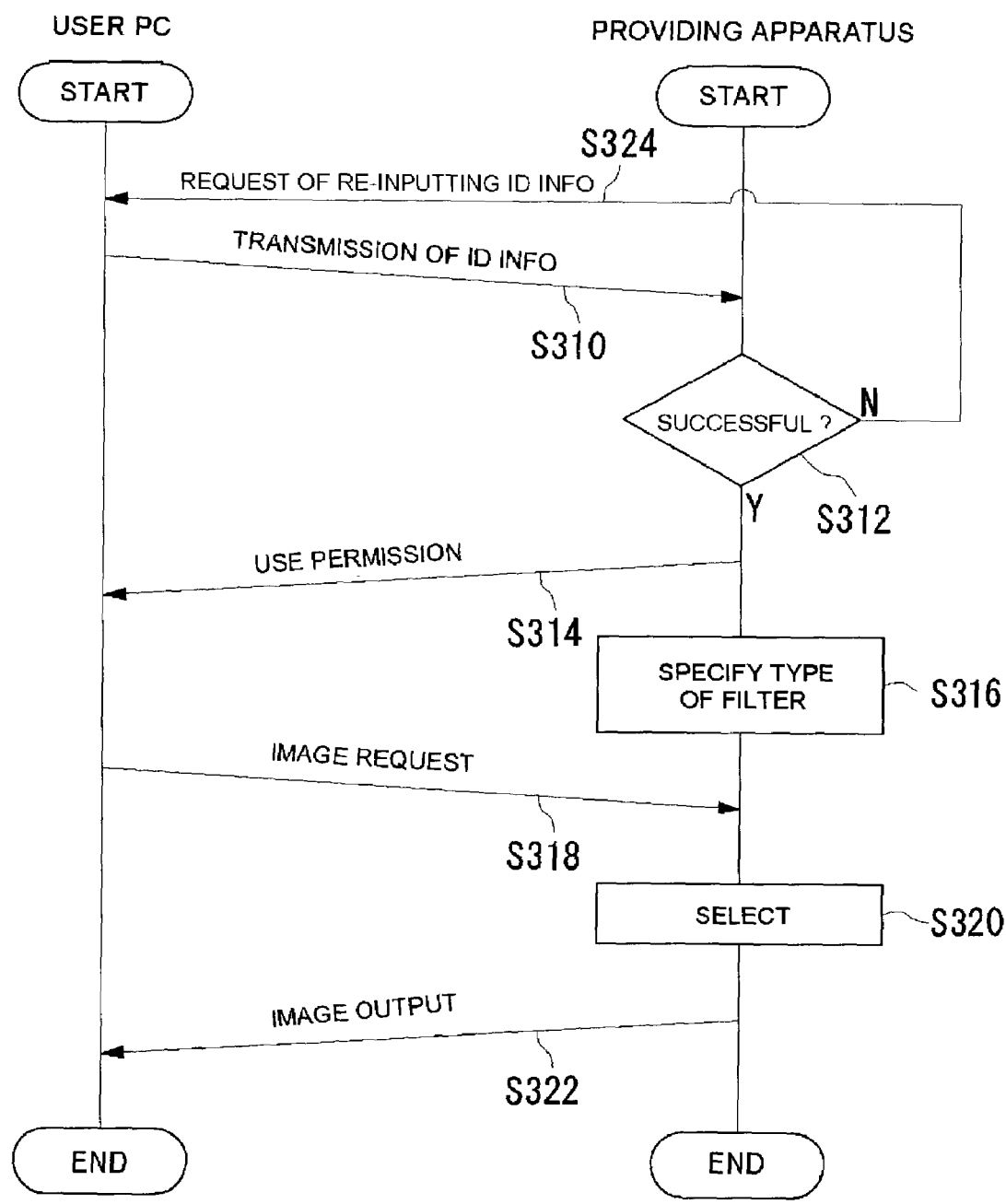
FIG. 19 is a sequence chart between a user computer and a providing apparatus at the time a basic image is provided, according to the third embodiment.

FIG. 19 is a sequence chart between the PC 332 and the providing apparatus 3100 when a basic image is transmitted. The PC 332 sends identification information, based on an instruction from the user (S310). An authentication unit 3102 authenticates the user based on the identification information provided (S312). When the authentication is not successful (N of S312), the authentication unit 3102 requests the PC 332 to re-input identification information (S324). When the authentication is successful (Y of S312), the authentication unit 3102 permits the PC 332 the use of the providing apparatus 3100 (S314). Moreover, the authentication unit 3102 specifies the type of image to be provided to the user to the selector 3104 based on the identification information (S316).

Thereafter, the PC 332 requests the providing apparatus 3100 to provide it with an image the user desires (S318). In response to this request, the selector 3104 selects the type of image specified by the authentication unit 3102 from the basic image database 3116 or the normal image database 3118 (S320) and sends the selected image to the PC 332 (S322).

The present invention has been described based on embodiments which are only exemplary. It is understood by those skilled in the art that there exist other various modifications to the combination of each component and each processing described and that such modifications are encompassed by the scope of the present invention.

In one of such modifications, some limitation may be placed on the usage of sample filters. In the data structure of the management information database 3114 described with reference to FIG. 18, a presentable number column 3154 is provided to limit the number of images presentable, but a limitation may be set for the period of usage. In this case, a field for holding the date and time of first access using identification information and a field for holding the period of usage from the starting date and time are newly provided in the management information database 3114. And the authentication unit 3102 permits supply of basic images to the user during the period where sample filters can be used. This type of limitation on the term of use is useful and meaningful in adding a variation to business strategy.

Fourth Embodiment

The object of the present invention is, in principle, to promote the distribution of stereoscopic images, but, in reality, it is for ISPs (Internet Service Providers) and other communication business enterprises which have also stereoscopic image providing services, to win not only more applicants for their Internet connection service with the stereoscopic image providing service as an added value but also more users of their stereoscopic image providing services and thereby gain more profits from these services. Such a communication enterprise can advertise the presence of its stereoscopic image providing service to its potential users by first storing a viewer program of images in its recording media for Internet connection service contract and then distributing optical filters together with the recording media to the users. And by allowing the users applying for the Internet connection service of this communication enterprise access to the parallax images which are basic to stereoscopic images, it is possible to promote the Internet connection service through the application from the users who have received the recording media and developed an interest in the stereoscopic image providing service. Furthermore, the stereoscopic image providing service may be so arranged as to provide higher-grade images under unique contract. This way, the communication enterprise may win contracts from the users who desire the supply of such images and thus make profits from such services.

Figure 20:
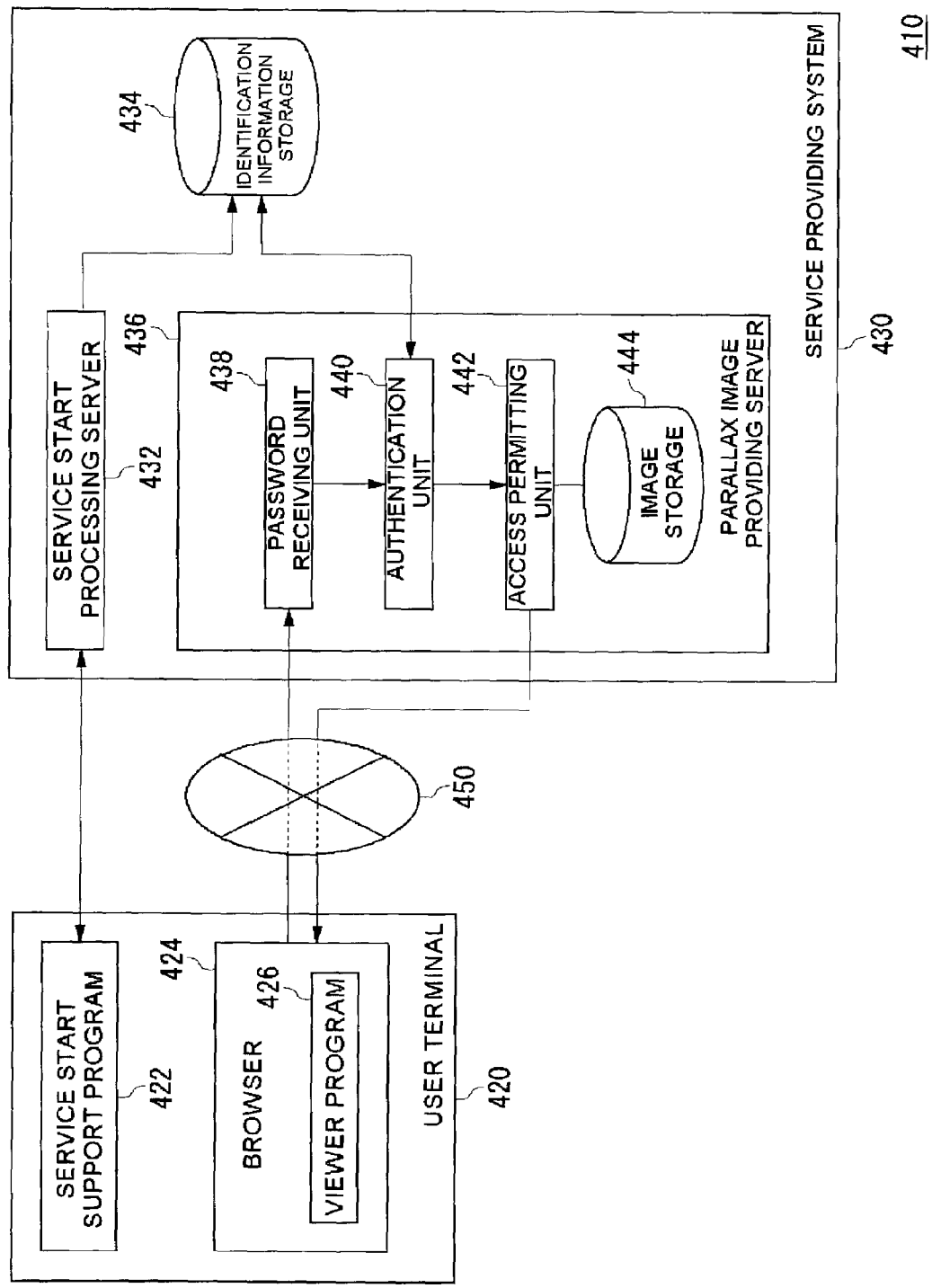
FIG. 20 shows a general structure of a network system implementing a stereoscopic image providing method according to a fourth embodiment.

FIG. 20 shows a general structure of a network system 410 implementing a stereoscopic image providing method according to a fourth embodiment of the present invention.

This network system 410 includes a user terminal 420 and a service providing system 430. The user terminal 420 is a PC (personal computer), a PDA, a portable telephone connectable to the service providing system 430, or any other arbitrary hardware. The service providing system 430 is a system managed by an ISP or other communication enterprise.

The user terminal 420 includes a service start supporting program 422 and a browser 424. The browser 424 may be a known application. The browser 424 includes as a plug-in software a viewer program 426 which can generate an image displayed stereoscopically from parallax images through an optical filter. The service start supporting program 422 and the viewer program 426 are offered to the users stored in such recording media as CD-ROM, memory card and magnetic media. The recording media may be distributed free of charge from the communication enterprise and may be distributed as an appendix to a PC magazine or the like. Moreover, optical filters may be distributed together with the recording media.

The service providing system 430 includes a service start processing server 432, an identification information storage 434 and a parallax image providing server 436. The service start processing server 432 provides an Internet connection service. The parallax image providing server 436 performs a service of distributing parallax images to the users. Here, the parallax image providing server 436 is installed within the service providing system 430, but it may be an independent server or may be realized in various other forms.

In terms of hardware, the structure of the service providing system 430 can be realized by a CPU, memory and other LSIs. In terms of software, it can be realized by memory-loaded programs or the like with service start processing functions and parallax image providing functions. The description in the present embodiment mainly concerns functions that are realized in cooperation with such components. Thus, it should be understood by those skilled in the art that these functions can be realized in a variety of forms by hardware only, software only or by the combination thereof.

The service start processing server 432 receives a request for service start from the user that has come through a telephone line using the service start supporting program 422. Then the service start processing server 432 acquires identification information on the user, such as user ID and password, and records the identification information in identification information storage 334. Here the request for service start may be a request for trial use instead of a formal contract, in which case the password given to the user may be subject to the term of validity applicable only to the trial period.

The user terminal 420 accesses the parallax image providing server 436 via the Internet 450. At this time, though not illustrated, the user terminal 420 is connected to the Internet 450 through a dial-up to a connection point provided by the communication enterprise managing the service providing system 430.

The parallax image providing server 436 provides parallax images to the user in response to the request therefor from the user who has requested for service start. The parallax image providing server 436 includes a password receiving unit 438 which receives a user ID and password from the user having requested for the parallax images, an authentication unit 440 which authenticates the inputted password, an image storage 444 which has the parallax images in storage, and an access permitting unit 442 which permits access to the parallax images.

The access permitting unit 442 permits access to the site where the parallax images stored in the image storage 444 is provided. When the user sees the parallax images within the site, a viewer program 426 is started. The viewer program 426 generates an image stereoscopically displayed through an optical filter from the parallax images within the site. As a result, the user can view the stereoscopic image.

By implementing a stereoscopic image providing method according to the present embodiment, even users who are not yet connected to the Internet may use this stereoscopic image providing service as soon as they have applied for an Internet connection service. Thus, the present embodiment can contribute greatly to the spread of the stereoscopic image providing service.

For Internet connection service providers, too, the present embodiment may present a merit of possibly winning more users by making use of this stereoscopic image providing service.

FIG. 21 shows an internal structure of the identification information storage 434. The identification information storage 434 includes a user ID column 460, a password column 462, a type of membership column 464, and an expiration date of password column 466. Here the type of membership is the classification of members who have access to the parallax images offered by the parallax image providing server 436. In this case, membership type "1" represents a regular member entitled to the stereoscopic image providing service, membership type "2" a regular member entitled to the Internet connection service, and membership type "3" a member who has temporarily applied for the Internet connection service. The member who has temporarily applied for the Internet connection service is given an expiration date with a predetermined period of time counted from the date of application. In this example, for the user whose user ID is "Hana", the password is "abcd1234", the type of membership is "3" and the expiration date of the password is "Sep. 30, 2001."

The access permitting unit 442 may permit access to different parallax images depending on the type of membership. Thereby, a member who has temporarily applied for the service, for instance, may experience a parallax image for trial use. Moreover, by offering higher-grade images to regular members entitled to the stereoscopic image providing service, the service providing side can win users who additionally hold contract with the stereoscopic image providing service also.

Figure 22:
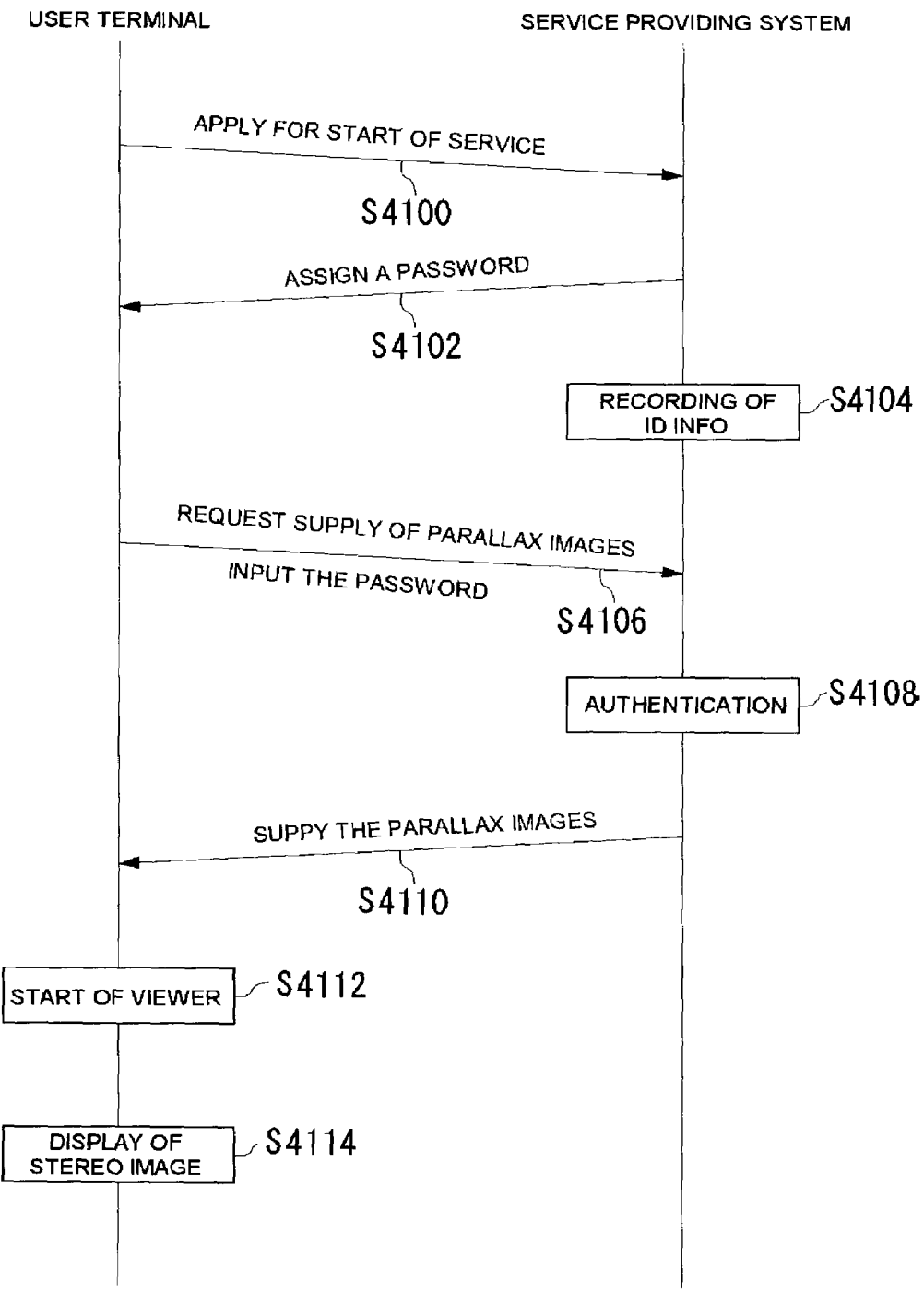
FIG. 22 shows a processing procedure in which a parallax image is supplied from a service providing system to a user terminal.

FIG. 22 shows a processing procedure in which the parallax images are supplied from the service providing system 430 to the user terminal 420.

First the user requests the start of an Internet connection service provided by the communication enterprise, using the service start supporting program 422 stored in his/her recording medium (S4100). In response to the input of necessary information by the user from his/her user terminal 420, the service start processing server 432 assigns a password to the user (S4102). The service start processing server 432 records the user identification information in the identification information storage 434 (S4104).

This completes the procedure for the start of an Internet connection service to be performed by the user. When the user requests the connection to the Internet by taking an ordinary procedure therefor, the service providing system 430 connects the user terminal 420 to the Internet 450.

The procedure from here on is performed by the user via the Internet 450. At the user's request for parallax images, the parallax image providing server 436 requests the user to input his/her password. The user inputs his/her password (S4106), and the parallax image providing server 436 now authenticates the password by referring to the identification information storage 434. Upon authentication of the password (S4108), the parallax image providing server 436 permits the user terminal 420 access to the parallax images and supplies the parallax images to the user (S4110). At this point, the viewer program 426 is activated (S4112). The viewer program 426 generates a stereoscopically displayed image from the parallax images and the user can see the stereoscopic image through the optical filter (S4114).

The present invention has been described based on embodiments which are only exemplary. It is understood by those skilled in the art that there exist other various modifications to the combination of each component and each processing described and that such modifications are encompassed by the scope of the present invention.

In the present embodiment, the service start processing server 432 has been described as one managed by an ISP who provides an Internet connection service. However, the service start processing server 432 may be one managed by a service provider who renders a contents service other than a stereoscopic image providing service.

Moreover, the connection of the user terminal 420 to the Internet 450 may be not only the dial-up connection using the telephone line but also a connection using the DSL technology or the like. The telephone line may be constructed of metallic cable, optical cable or wireless means.

In other variations, parallax images for trial use may be stored in the recording medium, so that even users who do not have the environment connected to the Internet may try images of a parallax image providing service. Moreover, a small trial version of optical filter may be distributed together with the recording medium, and at the entry into a formal contract, regular optical filters may be supplied to regular members of the Internet connection service or the stereoscopic image providing service.

Fifth Embodiment

Figure 23:
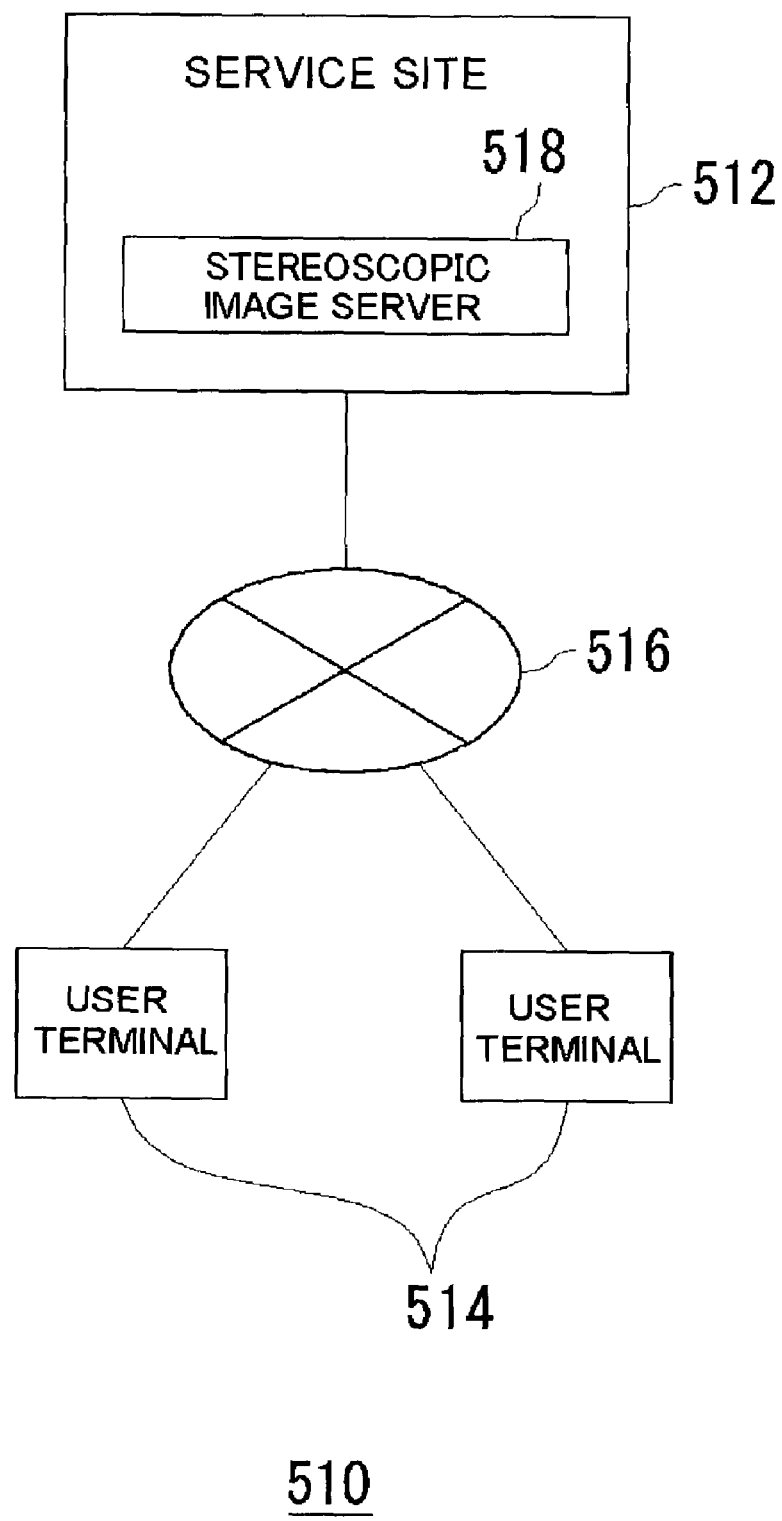
FIG. 23 shows a structure of a network system including a stereoscopic image server according to a fifth embodiment.

FIG. 23 shows a structure of a network system 510 employing a stereoscopic image providing technology according to the present embodiment. The network system 510 includes a service site 512 and a plurality of user terminals 514, which are connected via the Internet 516. The service site 512 is equipped with a stereoscopic image server 518 which is a device that provides stereoscopic images. The user accesses the service site 512 using the user terminal 514 and receives a stereoscopic image providing service. The stereoscopic image server 518 displays a confirmation image in a predetermined screen prior to starting its service to the user. This confirmation image that is for use in confirmation is an image that allows the user a stereoscopic vision with the naked eyes, so that by seeing this confirmation image beforehand, the user can, by himself/herself, determine his/her aptitude for stereoscopic vision.

Figure 24:
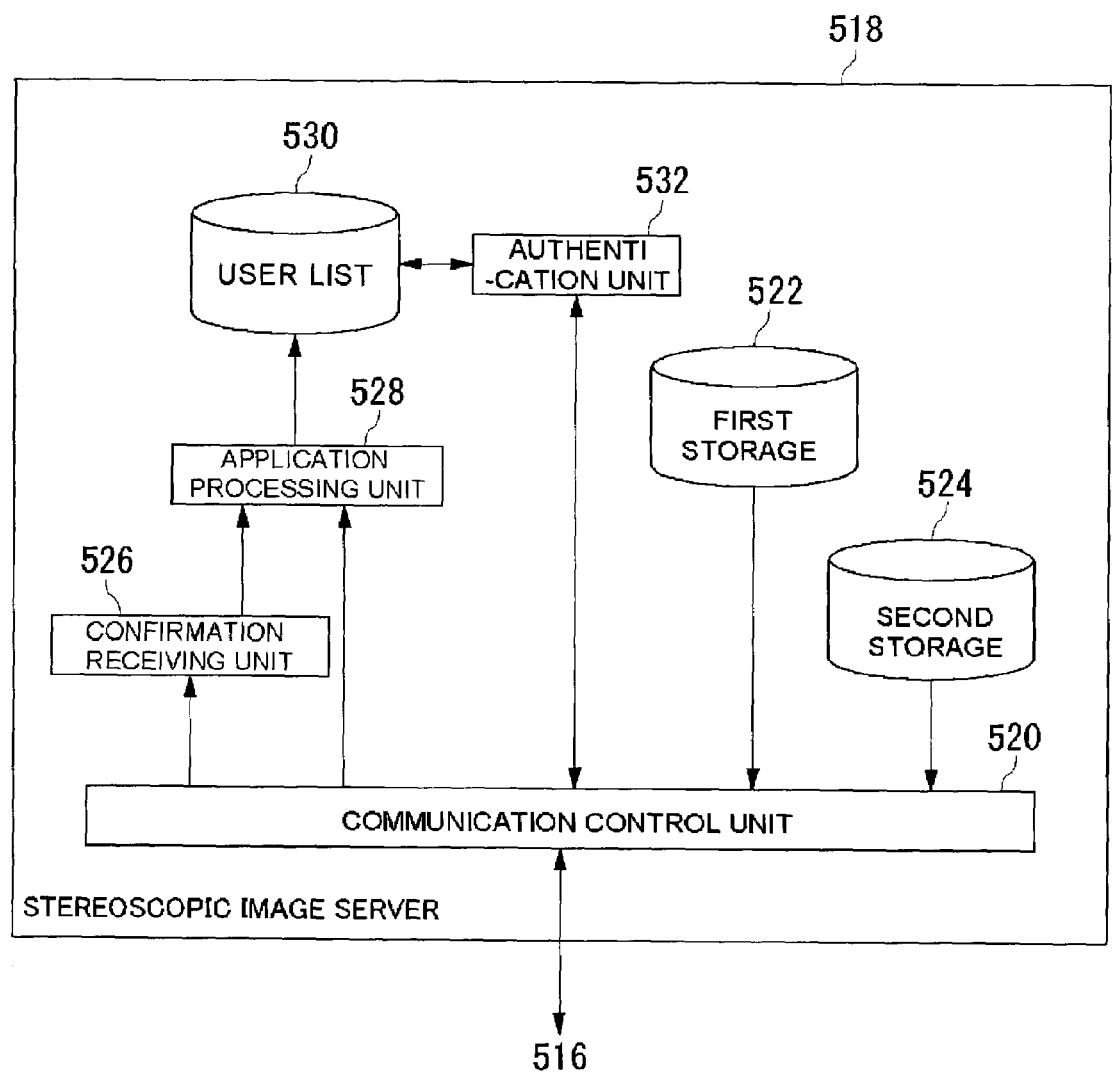
FIG. 24 shows a structure of a stereoscopic image server according to the fifth embodiment.

FIG. 24 shows a structure of the stereoscopic image server 518. The stereoscopic image server 518 includes a communication control unit 520 which controls communications via the Internet 516, a first storage 522 which has a storage of a plurality of stereoscopic images in advance, a second storage 524 which stores the above-described confirmation images, a confirmation receiving unit 526 which receives the notification from the user who has been able to visually capture the confirmation image properly, an application processing unit 528 which processes the application from the user for a stereoscopic image providing service, a user list 530 which manages information on application-accepted users as a list, and an authentication unit 532 which authenticates the user by referring to the user list 530 when any user requests access to a stereoscopic image.

This structure can base the known Web server technology as a system, and in terms of hardware it can be realized by a CPU, memory and other LSIs of an arbitrary computer. In terms of software, it is realized by, for instance, text files such as HTML (HyperText Markup Language) and XML (extensible Markup Language) and HTTPD (HyperText Transfer Protocol Daemon) and other programs. Here, however, the structure is represented by functional blocks realized in cooperation therewith. Therefore, it should be understood by those skilled in the art that these functional blocks can be realized in a variety of forms by hardware only, software only or by the combination thereof.

One characteristic in the processing by the stereoscopic image server 518 lies in that when a potential user applies for a stereoscopic image service, a confirmation image is shown to the user beforehand so that the user can judge for himself his/her aptitude for stereoscopic vision. Therefore, the application processing unit 528 does not simply accept the application from a user as it is, but permits the service only when there is a report from the confirmation receiving unit 526 indicating that the user has succeeded in viewing the confirmation image properly. This procedure can markedly reduce troubles where some of the users cannot properly see the stereoscopic vision after the actual start of a stereoscopic image service.

Figure 25:
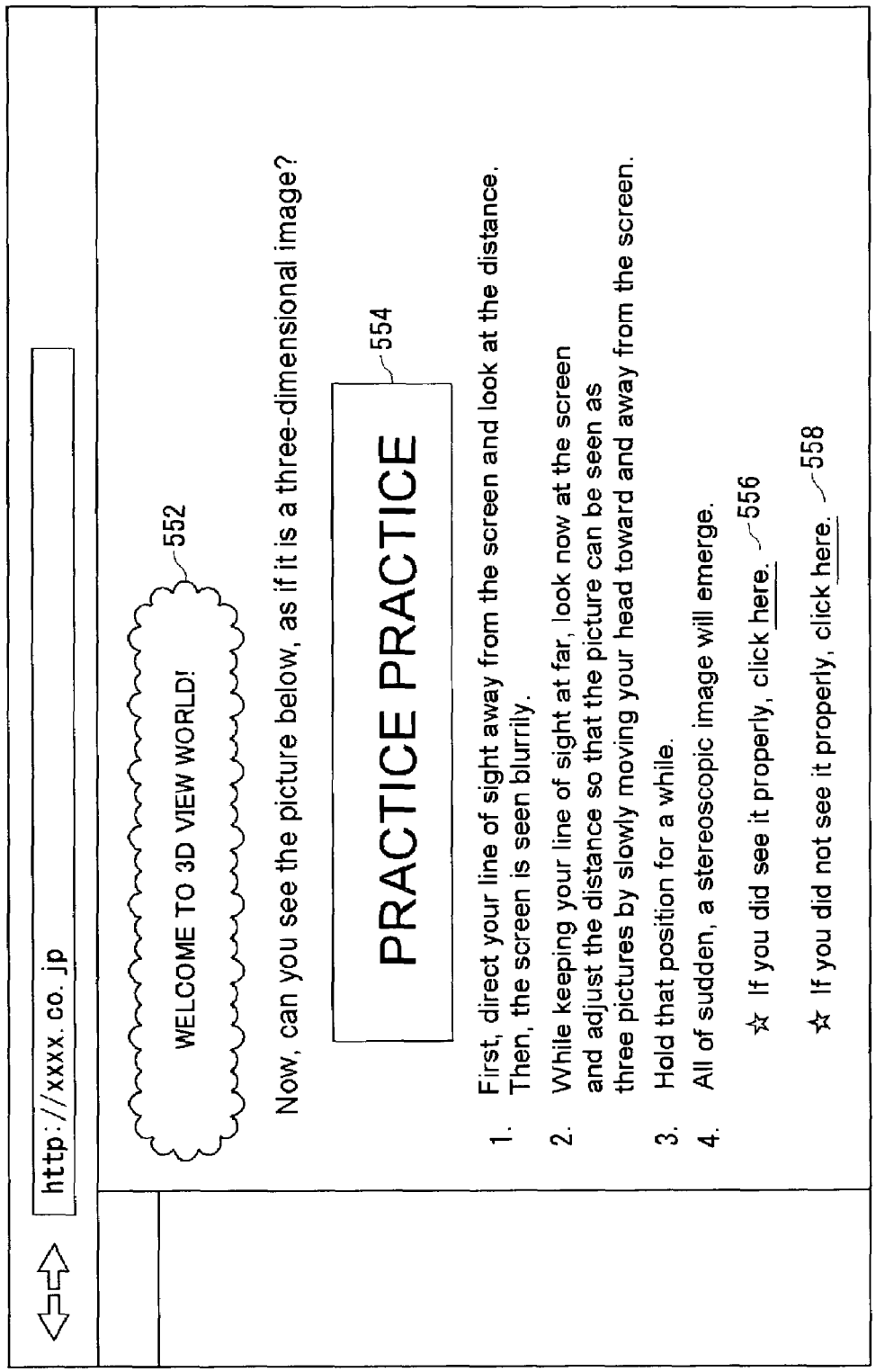
FIG. 25 shows a screen which is displayed when a user first visits the homepage of a service site.

FIG. 25 illustrates a screen 550 which is displayed when a user visits the homepage of the service site 512. In this case, a confirmation image 554 is displayed under the title "Welcome to 3D View World!" The confirmation image 554 is so structured that a stereoscopic vision can generally be seen with the naked eye, and the known image generating methods therefor are the parallel view method and the cross view method. The principle of the parallel view method is outlined as follows: If it is so arranged that a left-hand image is seen with the left eye and a right-hand image with the right eye, then the left and right images begin moving closer to each other, and the moment they meet at the center, a stereoscopic image is seen there. On the other hand, the principle of the cross view method is the opposite of the parallel view method; that is, the left-hand image is seen with the right eye, and the right-hand image with the left eye. In FIG. 25, a confirmation image 554 for the parallel view method is displayed, and below it are the instructions for a stereoscopic vision.

Displayed below the instructions are a first link 556 that leads the person who succeeded in the stereoscopic vision to another page and a second link 558 that leads the person who did not to still another page. At a click on the first link 556, the person who saw a stereoscopic vision properly is led to a screen 570 shown in FIG. 26. On the other hand, at a click on the second link 558, the person who did not see a stereoscopic vision properly is led to a screen 580 shown in FIG. 27.

Figure 26:
FIG. 26 shows a page to which a user who has been able to view an image for use in confirmation is linked.

FIG. 26 illustrates a linked page from the first link 556. Here, after the introduction: "This site has many stereoscopic images ready for your use . . . ", the service is outlined and then the procedure 572 for the start of the service is explained. Displayed further down are a comment 574 for the user to confirm his/her seeing the confirmation image 554 properly and therefore apply for the service or to cancel, and buttons 576 therefor. If the user clicks the apply button 576 on the screen 570, this action will be acquired by the confirmation receiving unit 526 by way of the communication control unit 520. Thereafter, the display will shift to an application form screen (not shown) with which necessary information will be acquired by the application processing unit 528 and then the user will be registered in the user list 530. In this fifth embodiment, an application action by the confirmation receiving unit 526 starts up the processing by the application processing unit 528.

Figure 27:
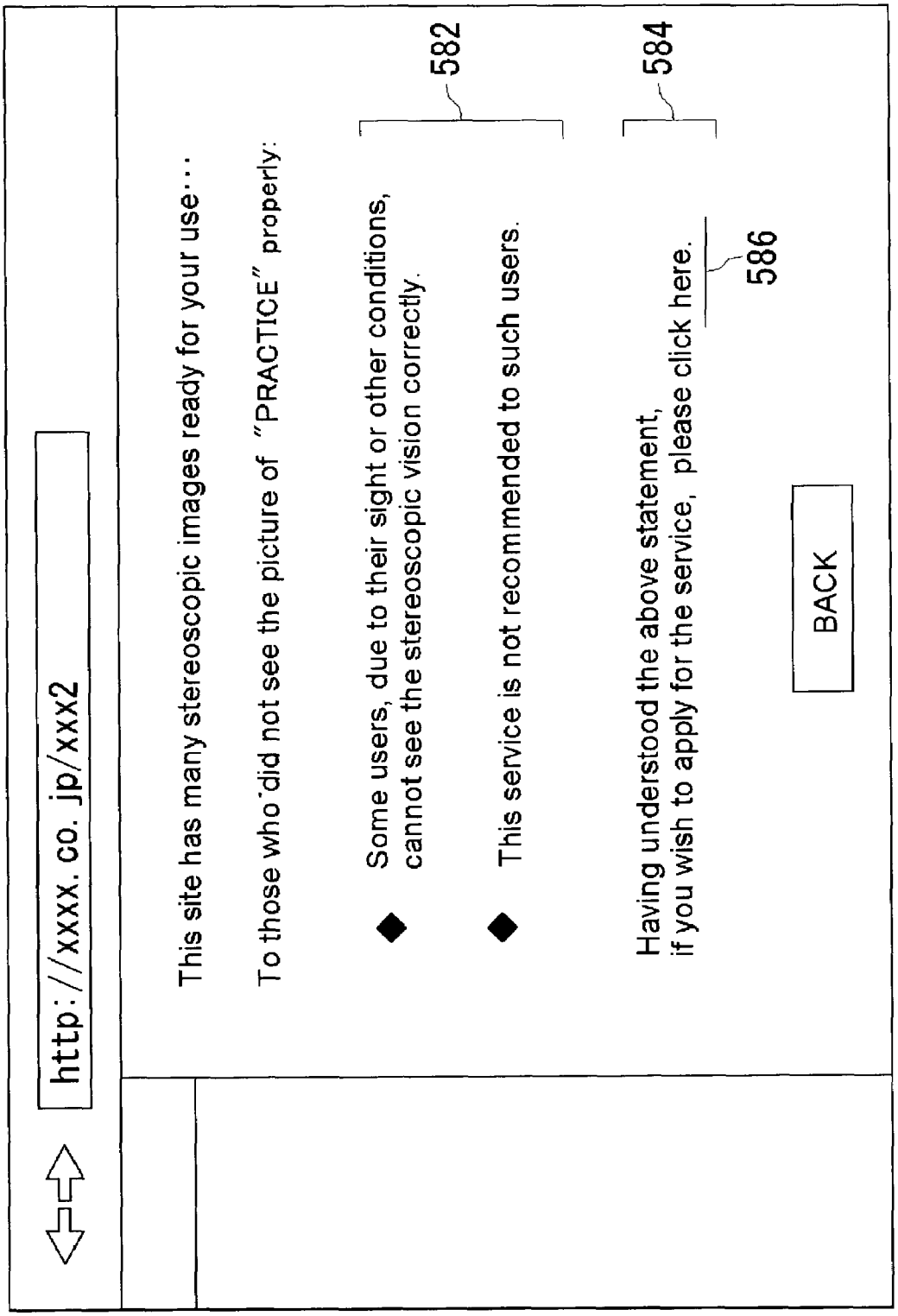
FIG. 27 shows a screen to which a user who failed to see the confirmation image correctly is linked.

FIG. 27, on the other hand, shows a screen 580 for the users who failed to see a stereoscopic vision correctly. Here, too, after a brief explanation of the site, a comment section 582 is displayed. In this comment section 582, there are statements to the effect that some users, due to their sight or other conditions, cannot see the stereoscopic vision correctly and that this service is not recommended to such users. Nevertheless, for those users who wish to apply for this service despite the above-mentioned difficulty, an instruction 584 and a link 586 are provided on the screen that will lead them to an application page. This feature provides a manager of the service site 512 with a kind of exemption or disclaimer effects because it is understood that the users who click the link 586 do so with the knowledge that a proper stereoscopic image service might not be available to them.

The present invention has been described based on embodiments which are only exemplary. It is understood by those skilled in the art that there exist other various modifications to the combination of each component and each processing described and that such modifications are encompassed by the scope of the present invention.

In the present embodiment, for instance, the offering of the service and the application therefor are done over the Internet 16. However, the application for the service may be made offline. For example, an advertisement for the service may be placed in a magazine together with a confirmation image. In such a case, too, the similar effect to the present embodiment can be achieved by having the users themselves check their aptitude for stereoscopic vision as indicated in FIG. 25.

In FIG. 26, the procedure 572 for the start of the service includes a statement to the effect that the user will receive a parallax barrier for stereoscopic vision. However, the present invention is of course applicable not only to the display of stereoscopic images using a parallax barrier but also to various other systems using a lenticular lens or any other arbitrary optical filter.

In the present embodiment, the aptitude of a user for stereoscopic vision is tested by the use of a confirmation image according to the parallel view method or the cross view method. However, it is not necessary that the confirmation image use one of these methods; it may be of any type so long as it can determine the user's aptitude for stereoscopic vision.

Sixth Embodiment

Figure 28:
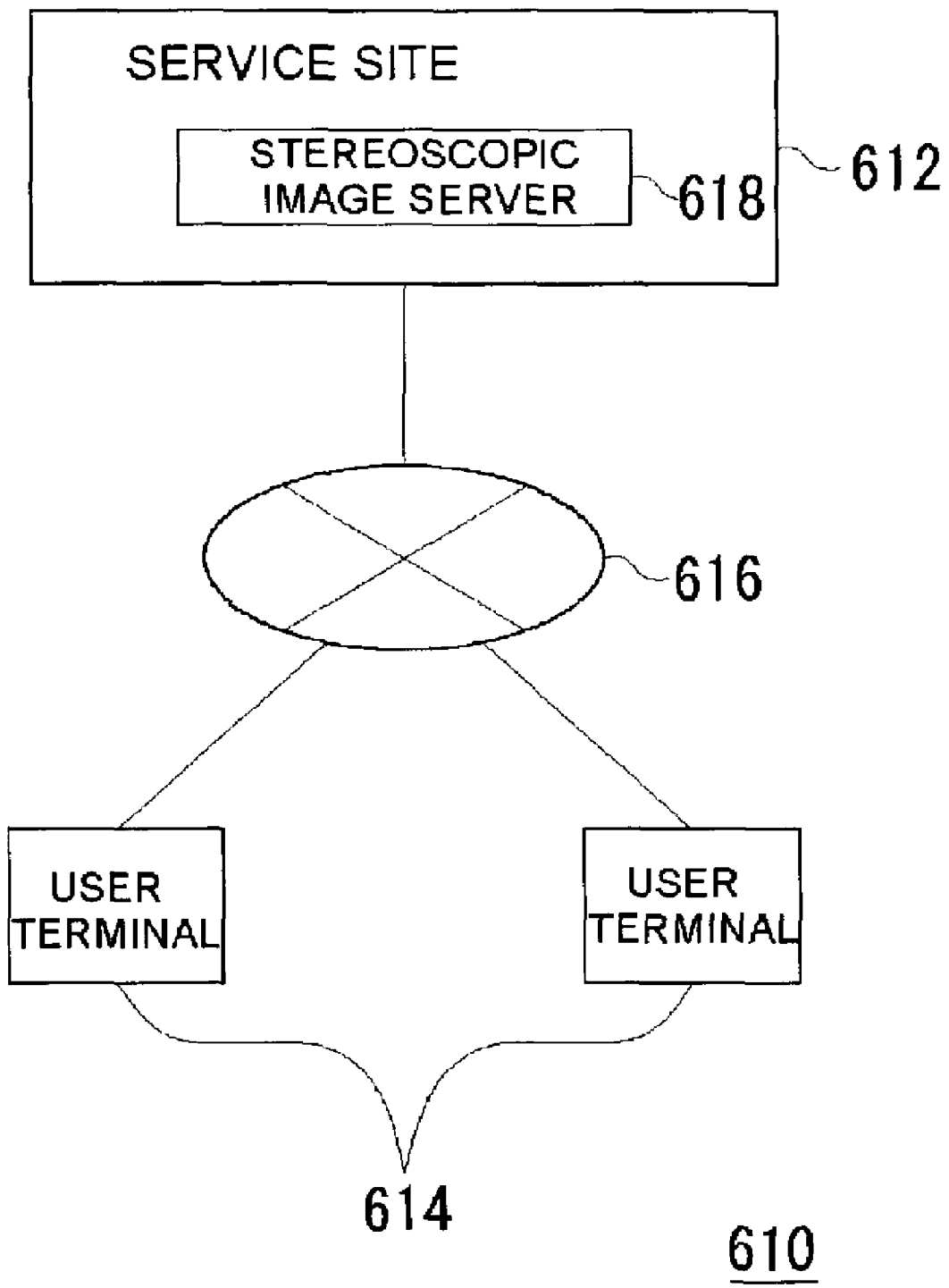
FIG. 28 is a general schematic diagram showing a structure of a network system including a stereoscopic image server, according to a sixth embodiment.

FIG. 28 shows a structure of a network system 610 employing a user authentication technology according to the present embodiment. The network system 610 includes a service site 612 and a plurality of user terminals 614, which are connected via the Internet 616. The service site 612 is equipped with a stereoscopic image server 618, which is a device that provides stereoscopic images. The user accesses the service site 612 using the user terminal 614 and receives a stereoscopic image providing service. The stereoscopic image server 618 displays a confirmation image in a predetermined screen prior to starting its service to the user. This image for use in confirmation, which is an image practically illegible without a parallax barrier, is so designed that, seen through a parallax barrier, the characters emerge from the background. By having the user tell the characters, it can be judged whether the user has a parallax barrier or not.

Figure 29:
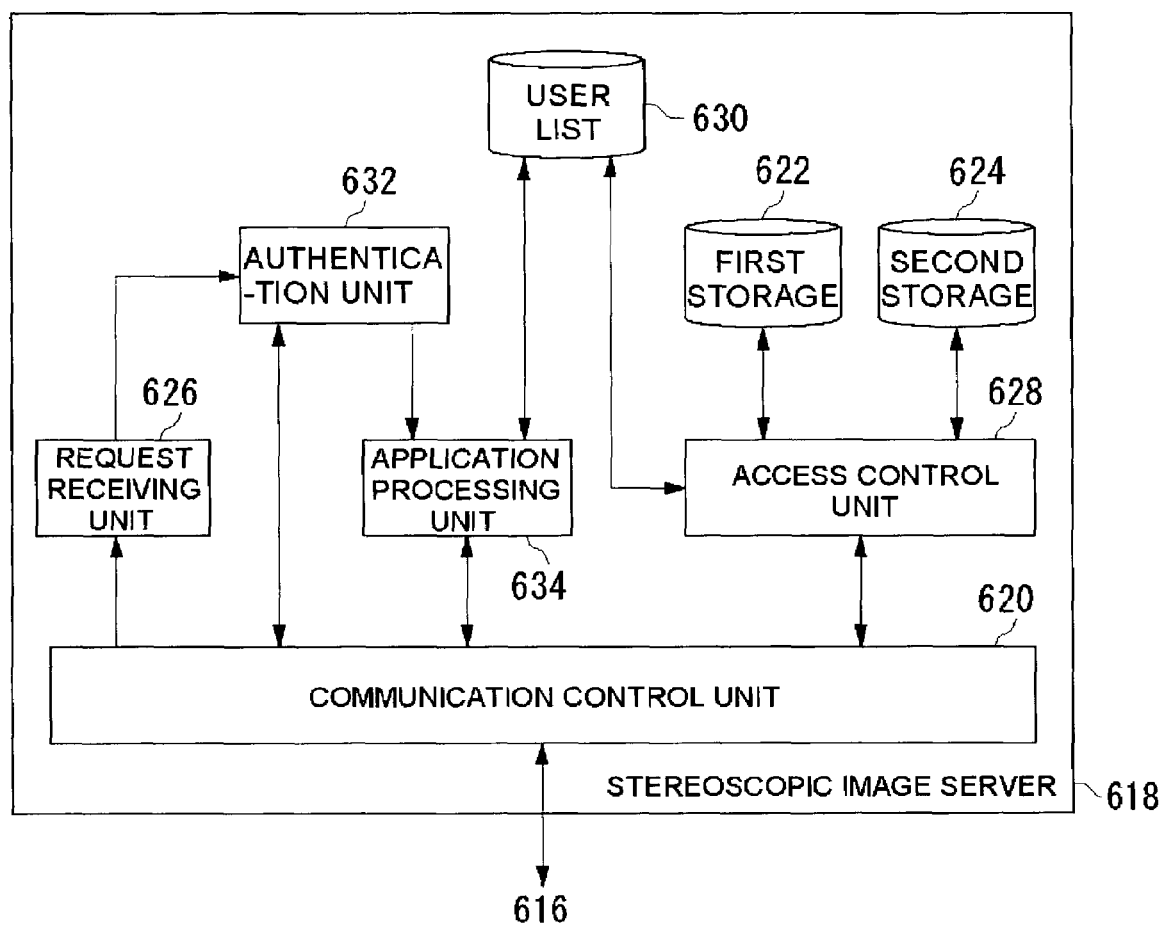
FIG. 29 shows a structure of a stereoscopic image server according to the sixth embodiment.

FIG. 29 shows a structure of the stereoscopic image server 618. The stereoscopic image server 618 includes a communication control unit 620 which controls communications via the Internet 616, a first storage 622 which has a storage of a plurality of stereoscopic images in advance, a second storage 624 which stores the above-described confirmation images, a request receiving unit 626 which receives a request from the user for accessing a stereoscopic image, an authentication unit 632 which authenticates the user making the request, an application processing unit 634 which processes the application for the service sent from the authenticated user, a user list 630 which manages information on application-accepted users as a list, and an access control unit 628 which controls the access by referring to the user list 630 when any user requests access to a stereoscopic image.

This structure can base the known Web server technology as a system, and in terms of hardware it can be realized by a CPU, memory and other LSIs of an arbitrary computer. In terms of software, it is realized by, for instance, text files such as HTML (HyperText Markup Language) and XML (extensible Markup Language) and HTTPD (HyperText Transfer Protocol Daemon) and other programs. Here, however, the structure is represented by functional blocks realized in cooperation therewith. Therefore, it should be understood by those skilled in the art that these functional blocks can be realized in a variety of forms by hardware only, software only or by the combination thereof.

One characteristic in the processing by the stereoscopic image server 618 lies in that when a user applies for a stereoscopic image service, the confirmation image is shown to the user and the user is asked to tell the characters that will emerge from the confirmation image, so that it can be judged whether the user has a parallax barrier or not. In other words, the application processing unit 634 accepts applications for the service only from the users who have a parallax barrier.

Figure 30:
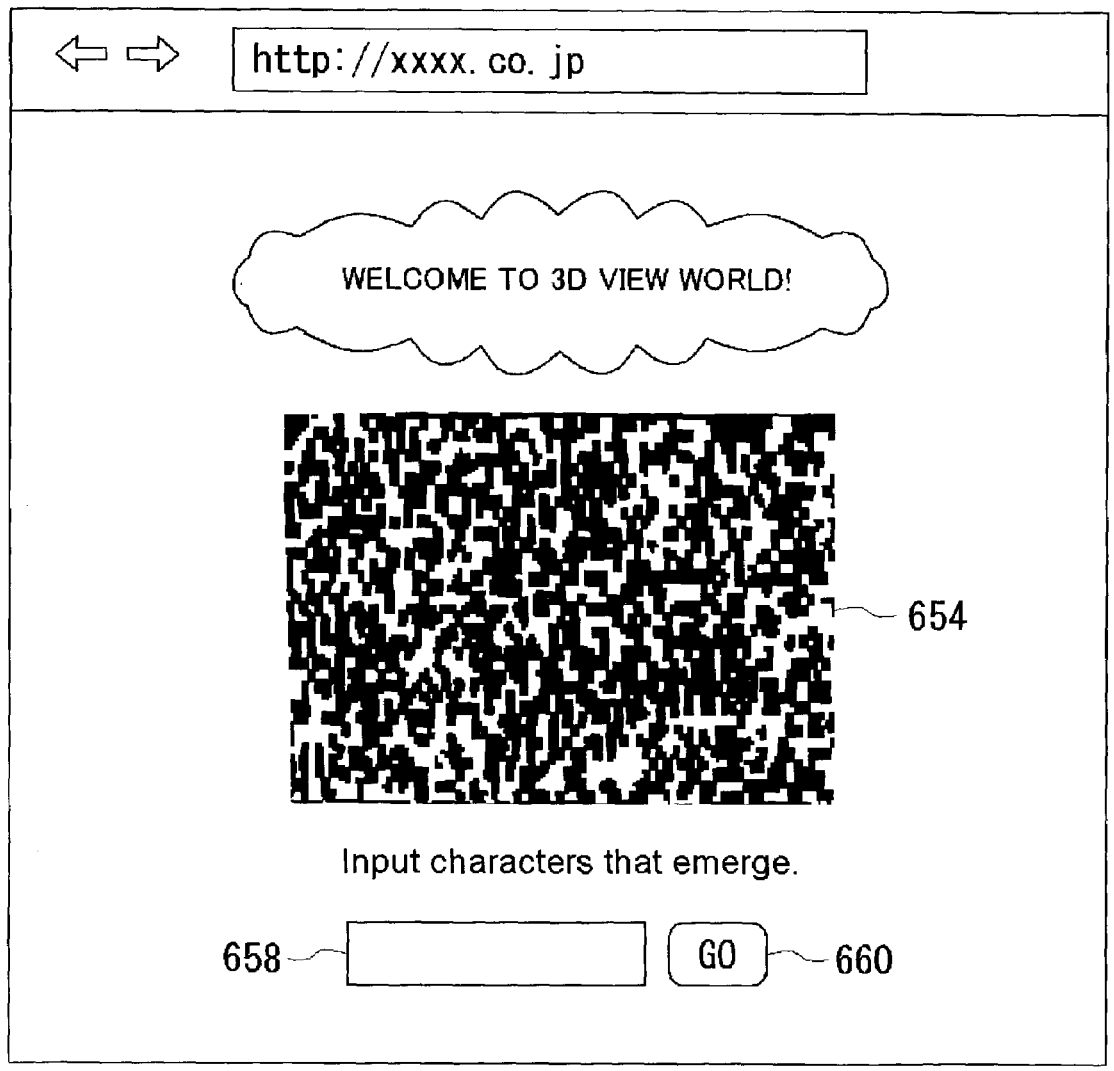
FIG. 30 shows a confirmation screen which is displayed when a user requests for access to an image at a service site.

FIG. 30 illustrates a confirmation screen 650 which is displayed when a user visits a homepage of the service site 612. In this case, a confirmation image 654 is displayed under the title "Welcome to 3D View World! " This confirmation image 654, which is an image with a pattern called dynamic random dots, is so designed that when seen through a parallax barrier, parts of it emerge from the background three-dimensionally. This image appears simply as a mosaic to the naked eye, and the parts to emerge cannot practically be distinguished without being seen through the parallax barrier. In the present embodiment, characters "x Y" are embedded in the confirmation image 654, so that the characters emerge when seen through the parallax barrier.

Figure 31:
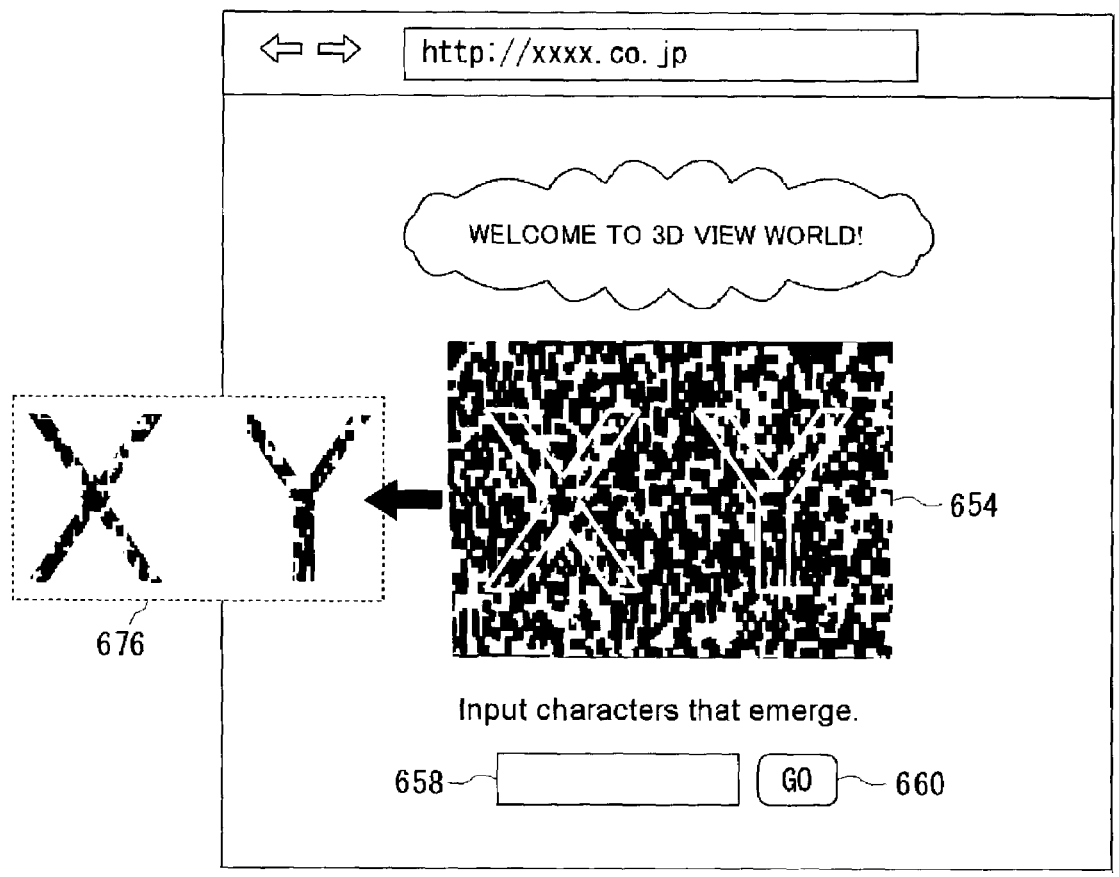
FIG. 31 shows how characters emerge in a confirmation image.

FIG. 31 shows how characters 676 emerge in the confirmation image 654. In this state, if the user focuses his sight on the emerging characters "XY", then the background blurs to the user and the user can read the characters easily. Now the user enters the characters in the entry box 658 and clicks a GO button 660, and the inputted characters will be acquired by the authentication unit 632 by way of the communication control unit 620. If the inputted characters are correct, a service application screen will be displayed. If they are not correct, a warning screen will be displayed.

Figure 32:
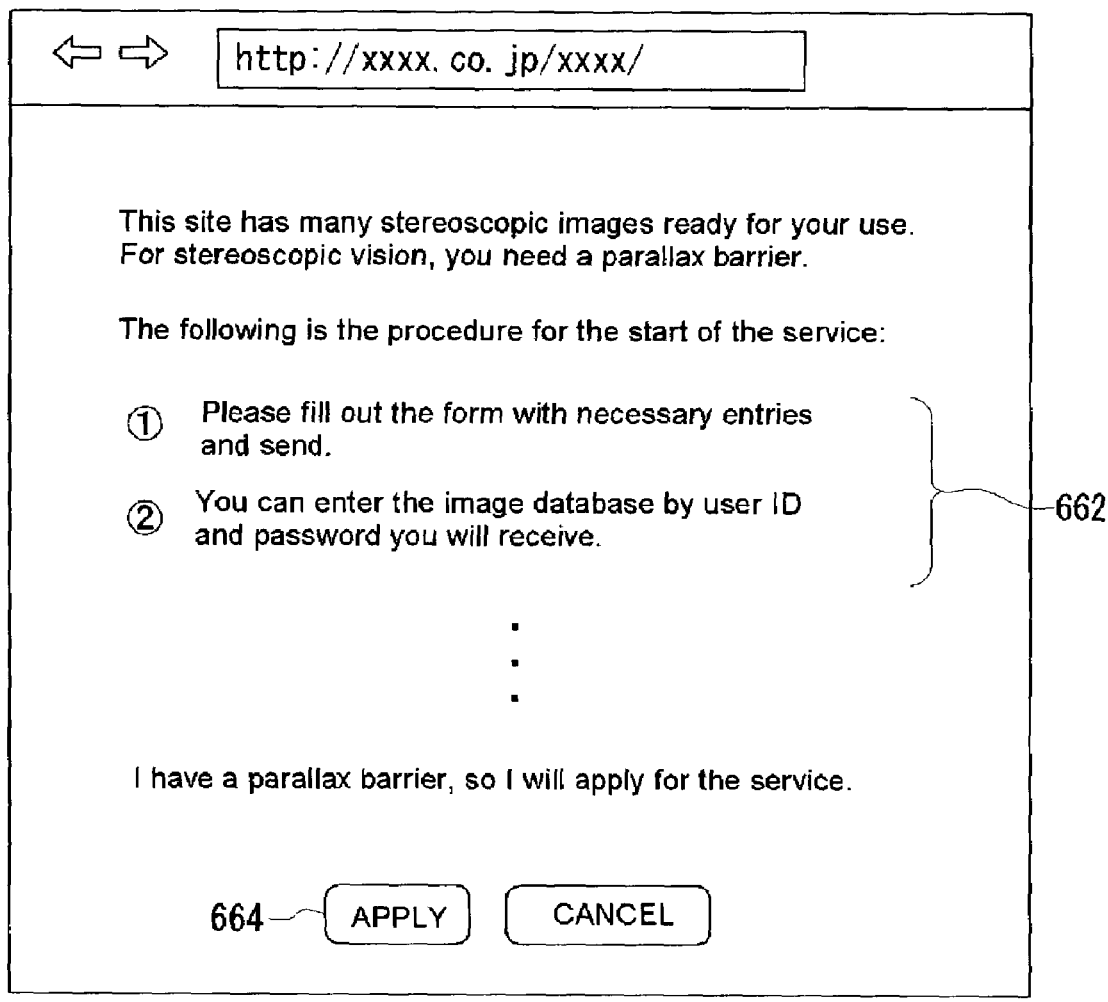
FIG. 32 shows a service application screen.

FIG. 32 shows a service application screen 670. This application screen 670 can practically be accessed only by the users who have the optical filter. Here, after the introduction stating that "This site has many stereoscopic images ready for your use. For stereoscopic vision, you need a parallax barrier", a procedure 662 for the start of the service is explained. Now, if the user clicks an apply button 664 on the application screen 670, this action will be acquired by the application processing unit 634 by way of the communication control unit 620. Thereafter, the display will shift to an application form screen (not shown) with which necessary information will be acquired by the application processing unit 634 and then the user will be registered in the user list 630.

Figure 33:
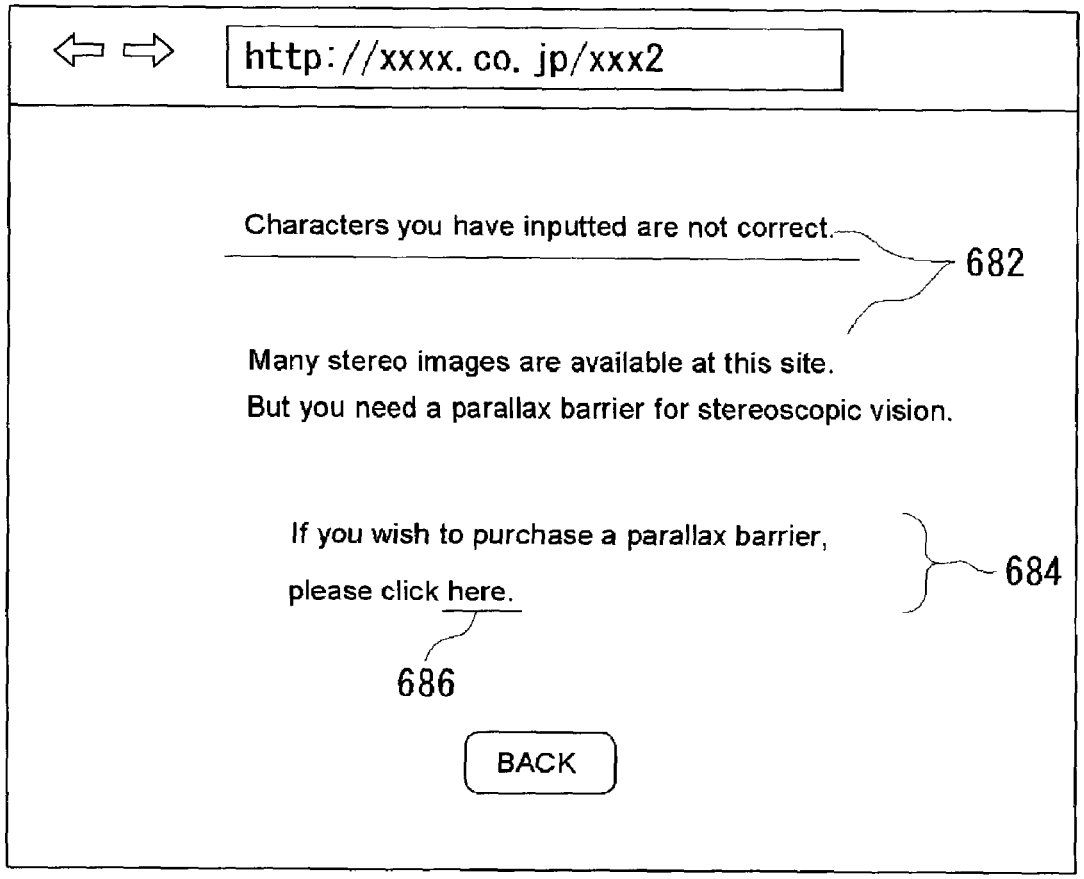
FIG. 33 shows a warning screen.

FIG. 33 shows a warning screen 680. The warning screen 680 is displayed for users who do not have a parallax barrier. Here, a warning statement 682 is displayed to warn the user that he/she cannot see stereoscopic images without a parallax barrier. A recommendation statement 684 recommends the user to purchase a parallax barrier. If the user clicks a "click here" button 686, the screen will jump to a parallax barrier sales site (not shown).

The present invention has been described based on embodiments which are only exemplary. It is understood by those skilled in the art that there exist other various modifications to the combination of each component and each processing described and that such modifications are encompassed by the scope of the present invention.

In the present embodiment, the parallax barrier has been used in the description as an example of the optical filter. However, the present invention is applicable not only to the display of stereoscopic images using a parallax barrier but also to various other systems using a lenticular lens or any other arbitrary optical filters.

In the present embodiment, the arrangement is such that some characters emerge from the confirmation image. In modifications thereof, an authentication method may be employed in which a picture or symbol other than characters is, for example, used as an emerging thing and the user is asked to pick one that agrees with it from among the pictures or symbols shown to the user.

Although the present invention has been described by way of exemplary embodiments, it should be understood that many changes and substitutions may further be made by those skilled in the art without departing from the scope of the present invention which is defined by the appended claims.

What is claimed is:

1. A method of providing an image for use in stereovision, the method including:
    assigning identification information to an optical filter when the optical filter which is to be mounted on a display device to view an image stereoscopically is distributed to a user;
    authenticating the user when the user to whom the optical filter is distributed accesses a site on a network by using said identification information; and
    permitting access of the authenticated user to the image.

2. A method according to claim 1, wherein downloading of a viewer program for viewing the image stereoscopically is permitted to a user who has presented the identification information.

3. A system for providing an image for use in stereovision, the system including:
    a client computer having a display device on which an optical filter for viewing the image stereoscopically is mounted; and
    a providing apparatus which receives identification information assigned for each of the optical filters, and, based on the identification information, transmits to said client computer an image for use in stereovision fit for the optical filter.

4. An apparatus for providing an image for use in stereovision, the apparatus comprising:
    a receiving unit which receives, from a client computer having a display device on which an optical filter for viewing the image stereoscopically is mounted, identification information assigned for each of the optical filters;
    a first storage which stores the identification information and a type of an optical filter to which the identification information is assigned, in a manner that the identification information is associated with the optical filter type;
    a specifying unit which specifies the type of an optical filter based on data stored in said first storage and the identification information received;
    a second storage which stores an image for use in stereovision for each type of the optical filters;
    a selecting unit which selects from said second storage an image for use in stereovision according to the optical filter type; and
    a transmission unit which transmits the selected image for use in stereovision to the client computer.

5. A stereo image providing method, comprising:
    prior to starting a service of providing a stereoscopic image via a network, a stereogram that allows a user a stereoscopic vision with naked eyes is provided as a confirmation image at a network node involved in the service to allow the user to check to see whether the stereoscopic image is viewed stereoscopically, wherein
    effect of the service is not guaranteed or a statement that serves to prevent applying for the service is presented together with the confirmation image for a user who fails to visually capture the confirmation image as a stereoscopic image.

6. An apparatus for providing a stereoscopic image to a user, the apparatus including:
    a first storage which stores stereoscopic images;
    a second storage which stores a stereogram that allows the user a stereoscopic vision with naked eyes as a confirmation image which allows the user to check to see whether the stereoscopic image is viewed stereoscopically;
    a control unit which, when the user applies for a service of providing the stereoscopic image, displays the confirmation image at a user terminal at a scene associated with the application;
    a confirmation receiving unit which receives notification from the user who has been able to visually capture the confirmation image properly; and
    an application processing unit which accepts application of the service only for a user who has notified to the effect that the confirmation image was visually captured properly.

7. A user authenticating method including:
    displaying, prior to access by a user to a stereoscopic image, information necessary for authenticating the user at a terminal of the user in a state such that the information cannot be practically interpreted without a predetermined optical filter which serves to realize a proper stereovision of the stereoscopic image.

8. A user authenticating apparatus which manages a stereoscopic image, the apparatus including:
a request receiving unit which receives from the user a request for access to the stereoscopic image; and
an authentication unit which authenticates the user who made the request,
wherein said authentication unit presents information necessary for authenticating the user to a terminal of the user in a state such that the information cannot be practically interpreted without a predetermined optical filter which serves to realize a proper stereovision of the stereoscopic image.

\* \* \* \* \*